United States Patent
Liu et al.

(10) Patent No.: US 12,542,305 B2
(45) Date of Patent: Feb. 3, 2026

(54) POWER TOOL AND POWER TOOL SYSTEM

(71) Applicant: Globe (Jiangsu) Co., Ltd., Changzhou (CN)

(72) Inventors: Chuanjun Liu, Changzhou (CN); Xian Zhuang, Changzhou (CN); Ming Luo, Changzhou (CN); Biao Li, Changzhou (CN); Zhiyuan Li, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 563 days.

(21) Appl. No.: 18/070,498

(22) Filed: Nov. 29, 2022

(65) Prior Publication Data

US 2023/0131365 A1  Apr. 27, 2023

Related U.S. Application Data

(63) Continuation of application No. PCT/CN2021/100553, filed on Jun. 17, 2021.

(30) Foreign Application Priority Data

Jun. 18, 2020  (CN) .......................... 202010557288.8
Jun. 18, 2020  (CN) .......................... 202010557390.8
Jun. 18, 2020  (CN) .......................... 202021141817.8
Jun. 18, 2020  (CN) .......................... 202021141998.4

(51) Int. Cl.
*H01M 10/42* (2006.01)
*B25F 5/02* (2006.01)

(52) U.S. Cl.
CPC ........... *H01M 10/4207* (2013.01); *B25F 5/02* (2013.01); *H01M 2220/30* (2013.01)

(58) Field of Classification Search
CPC ........................................................ B25F 5/02
See application file for complete search history.

(56) References Cited

U.S. PATENT DOCUMENTS

| | | | | |
|---|---|---|---|---|
| 4,932,294 A | * | 6/1990 | Chang | B25F 5/02 81/177.4 |
| 5,028,858 A | * | 7/1991 | Schnizler | B23B 45/02 320/136 |
| 6,057,608 A | * | 5/2000 | Bailey, Jr. | H01M 50/202 307/64 |
| 6,502,949 B1 | * | 1/2003 | Horiyama | B23Q 17/2404 362/198 |
| 7,182,150 B2 | * | 2/2007 | Grossman | B25F 5/003 173/171 |
| 2005/0044051 A1 | * | 2/2005 | Selby | G06Q 99/00 705/500 |

(Continued)

FOREIGN PATENT DOCUMENTS

| | | | | | |
|---|---|---|---|---|---|
| CN | 106233915 A | * | 12/2016 | ........... | A01D 34/001 |
| DE | 102008040061 A1 | * | 1/2010 | ........... | B25F 5/02 |
| WO | 2014153034 A1 | | 9/2014 | | |

*Primary Examiner* — Lucas E. A. Palmer

(57) ABSTRACT

The disclosure provides a power tool and power tool system, including: a first slot and a second slot; when the power tool is in a double-pack working state, battery packs are respectively arranged in the first slot and the second lot; when the power tool is in a single-pack working state, the battery pack is arranged in the first slot or the second slot, and both the double-pack working state and the single-pack working state provides a same rated voltage to the power tool.

16 Claims, 16 Drawing Sheets

(56) References Cited

U.S. PATENT DOCUMENTS

| | | | | |
|---|---|---|---|---|
| 2011/0147031 A1* | 6/2011 | Matthias | B25F 5/02 | 173/171 |
| 2011/0197389 A1* | 8/2011 | Ota | H01M 50/213 | 429/121 |
| 2013/0130552 A1* | 5/2013 | Ota | H02J 7/00712 | 439/639 |
| 2015/0104250 A1* | 4/2015 | Tada | H01M 50/247 | 403/375 |
| 2015/0328763 A1* | 11/2015 | Ito | H02J 7/0045 | 173/217 |
| 2015/0328764 A1* | 11/2015 | Yoshikane | B25D 16/00 | 173/104 |
| 2015/0328796 A1* | 11/2015 | Okouchi | B25F 5/02 | 30/388 |
| 2015/0367497 A1* | 12/2015 | Ito | B25F 5/02 | 173/217 |
| 2015/0375313 A1* | 12/2015 | Kani | B23D 45/042 | 83/471.2 |
| 2015/0375315 A1* | 12/2015 | Ukai | B23D 51/00 | 30/392 |
| 2015/0375416 A1* | 12/2015 | Haneda | B25F 5/02 | 30/383 |
| 2017/0334056 A1* | 11/2017 | Kawakami | B25F 5/006 | |
| 2018/0241281 A1* | 8/2018 | Doan | H02K 3/522 | |
| 2018/0304454 A1* | 10/2018 | Kawakami | B23Q 11/08 | |
| 2019/0326765 A1* | 10/2019 | Huber | H02J 7/0025 | |
| 2020/0306906 A1* | 10/2020 | Yoshikane | B23Q 17/007 | |
| 2020/0316766 A1* | 10/2020 | Machida | B25H 3/006 | |
| 2021/0013726 A1* | 1/2021 | Hill | B25F 5/00 | |
| 2021/0354219 A1* | 11/2021 | Fu | B27B 9/00 | |
| 2022/0023962 A1* | 1/2022 | Menze | B23D 47/02 | |
| 2024/0266619 A1* | 8/2024 | Yamaguchi | H01M 50/509 | |
| 2025/0001574 A1* | 1/2025 | Wolf | B25F 5/02 | |

* cited by examiner

POWER TOOL AND POWER TOOL SYSTEM

CROSS-REFERENCE TO RELATED APPLICATIONS

The present application is a continuation application of PCT application filing PCT/CN2021/100553 filed on Jun. 17, 2021, which claims the benefit of CN202010557288.8 filed on Jun. 18, 2020, CN202021141817.8 filed on Jun. 18, 2020, CN202010557390.8 filed on Jun. 18, 2020, and CN202021141998.4 filed on Jun. 18, 2020. All the above are hereby incorporated by reference, including any appendices or attachments thereof, for all purposes.

TECHNICAL FIELD

The disclosure relates to a field of power tools, in particular to a power tool and power tool system.

BACKGROUND

At present, there are more and more hand-held power tools on the market, especially in the garden tools industry, such as pruner, grass trimmer, scarifier machine, lawn mower and so on. In order to prolong the service life and improve the power of power tools and simultaneously consider the simplicity and universality of the replacement of the battery pack, the power tools usually adopt a scheme of multiple battery packs, and more usually adopts double battery packs. When in use, the two battery packs need to be installed into the corresponding slot of the power tool to provide an output voltage matching the rated voltage of the power tool, so that the power tool can work properly; power tool will not work properly if only a single battery pack is installed.

Therefore, in view of the above-mentioned problems, it is necessary to improve the existing power tools.

SUMMARY

In view of the above-mentioned defects of current power tools, the disclosure provides a power tool and a power tool system, which can work properly at a rated voltage under the condition of either installed with a single battery pack or double battery packs.

The disclosure provides a power tool, which includes:
a first slot;
as well as a second slot;
in which, when the power tool is in a double-pack working state, the first slot and the second slot are respectively installed with a battery pack; when the power tool is in a single-pack working state, the first slot or the second slot is installed with the battery pack, both the double-pack working state and the single-pack working state provides a same rated voltage to the power tool.

The disclosure also proposes a power tool system, including:
at least one battery pack;
a power tool having:
a first slot, and
a second slot; wherein
when the power tool is in a double-pack working state, the battery packs are respectively arranged in the first slot and the second slot;
when the power tool is in a single-pack working state, the battery pack is arranged in the first slot or the second slot, and
both the double-pack working state and the single-pack working state provides a same rated voltage to the power tool.

To sum up, the disclosure provides a power tool and a power tool system, the power tool can provide a single battery pack working state and a double battery packs working state, the single battery pack working state and the double battery packs working state can both provide the same rated voltage to the power tool, so as to improve the working time of the power tool.

DETAILED DESCRIPTION

The following specific detailed embodiments are used to illustrate the implementation of this disclosure. Those skilled in the art can easily understand the other advantages and effects of the disclosure from the content disclosed. The disclosure can also be implemented or applied in different specific ways, and the details can also be modified or changed based on different viewpoints and applications without disengaging from the idea of this disclosure.

As a further explanation, the figures shown in the embodiments only explains the basic conception of the disclosure, thus the figures only show the modules related to this disclosure rather than the number, shape and size of the modules according to the actual embodiments of the disclosure, in the actual embodiments the modules' type, quantity and proportion can be randomly changed, and its component layout pattern may also be more complex. It can be an arbitrary change, and the module layout might also be more complex.

Figure 1:
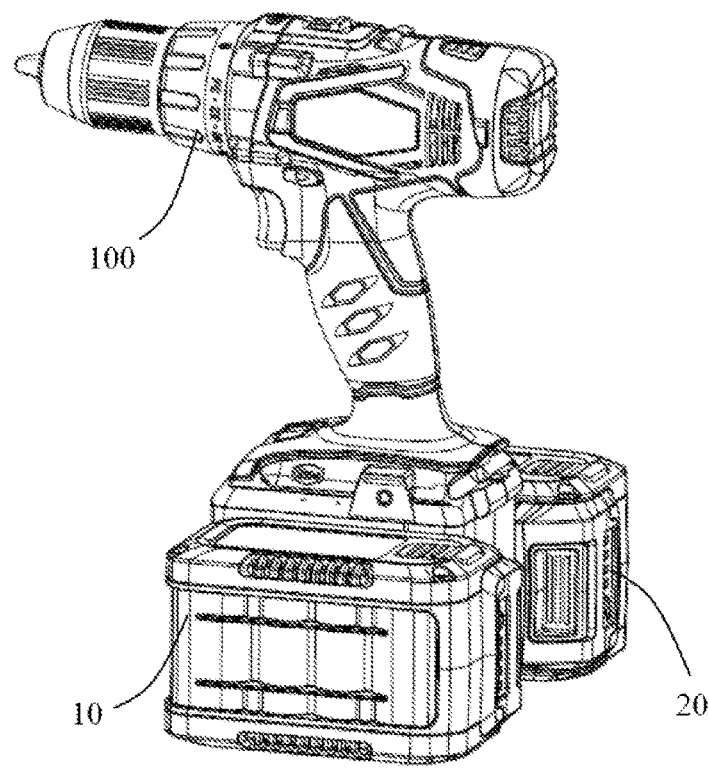
FIG. 1 is a perspective assembly diagram of a power tool system disclosed.

As shown in FIG. 1, the disclosure provides a portable power tool 100, which can be powered by electric energy storage devices for wireless operation. The power tool 100 can be a pruner, a chain saw, a hair dryer, a cleaning machine, a lawn mower, a scarifier machine, etc. In this embodiment, an electric drill is taken as an example to illustrate.

As shown in FIG. 1, the rated voltage of the power tool 100 is 48V and the power tool 100 can be coupled with two battery packs. Each battery pack includes at least two battery groups with the same rated voltage, each battery group may contain one or more battery units, in this embodiment, the output voltage of each battery group is 24V. Two slots are respectively set at the left and right side of the bottom of the power tool 100, each slot is used for holding and coupling with one of the battery pack, the structure of the two battery packs are exactly the same, the structure of the two slots are exactly the same. To facilitate the description, the two battery pack are respectively defined as the first pack battery pack 10 and second battery pack battery pack 20, each battery pack includes two battery groups, the two slots are defined as the first slot 11 coupling with the first battery pack 10 and the second slot 21 coupling with the second battery pack 20.

As shown in FIGS. 2(a) to 2(c), the power tool includes three working states, the first working state is installing only the first battery pack 10 in the first slot 11, the second working state is installing only the second battery pack 20 in the second slot 21, the third working state is installing the first battery pack 10 and the second battery pack 20 respectively in the first slot 11 and the second slot 21. The first and second working states can be regarded as the same working state, that is, only one of the slots is installed with a battery pack, which can be defined as a single pack working state, and the third working state can be defined as a double pack working state. Both of these two working state can achieve a fixed voltage output of 48V, that is, whether the power tool 100 is installed with one battery pack 10 or 20, or two battery packs 10 and 20, the power tool can operate normally under the rated voltage of 48V. Every battery group of the two battery packs 10 and 20 is set with a pair of negative and positive electrodes, in detail including a first negative electrode, a second negative electrode, a first positive electrode and a second positive electrode. According to FIGS. 3(a) to 3(b), every slot is set with a group of electrode terminals, the first slot is set with the first negative electrode terminal 101, the second negative electrode terminal 103, the first positive electrode terminal 102 and a second positive electrode terminal 104, connecting respectively with the first negative electrode, the second negative electrode, the first positive electrode and the second positive electrode of the first battery pack 10. The second slot is set with the first negative electrode terminal 105, the second negative electrode terminal 107, the first positive electrode terminal 106 and a second positive electrode terminal 108, connecting respectively with the first negative electrode, the second negative electrode, the first positive electrode and the second positive electrode of the second battery pack 20. Via the control of different connection states of the eight electrode terminals 101, 102, 103, 104, 105, 106, 107, and 108, the connection states of the two battery groups in the battery packs 10 and 20 which are installed in the slots 11 and 12 are adjusted.

From the diagram of the connection of the electrode terminals shown in FIG. 2(a) to FIG. 2(c), "1−" and "1+" on the left side of the FIGURES indicate the first negative electrode terminal 101 and the first positive electrode terminal 102 of the first negative electrode and the first positive electrode of the first battery pack 10, "2−" and "2+" indicate the second negative electrode terminal 103 and the second positive electrode terminal 104 of the second negative electrode and the second positive electrode of the first battery pack 10. "1−" and "1+" on the right side of the FIGURES indicate the first negative electrode terminal 105 and the first positive electrode terminal 106 of the first negative electrode and the first positive electrode of the second battery pack 20, "2−" and "2+" indicate the second negative electrode terminal 107 and the second positive electrode terminal 108 of the second negative electrode and the second positive electrode of the second battery pack 20. In which the first negative electrode terminal 101 marked as "1−" on the left side is the negative electrode output terminal, the second positive electrode terminal 108 marked as "2+" on the right side is the positive electrode output terminal, the following figures will follow this definition, any differences other than this will be explained.

As shown in FIG. 2(a), FIG. 2(a) shows the first working state, the power tool 100 is only installed with the first battery pack 10, the second negative electrode terminal 103 marked as "2−" on the left side is connected with the first positive electrode terminal 102 marked as "1+" on the left side, which is to connect the second negative electrode and the first positive electrode of the first battery pack 10, which makes the two battery groups of the first battery pack 10 connect in series, the output voltage of the first battery pack 10 is now 48V; the first negative electrode terminal 105 marked as "1−", the first positive electrode terminal 106 marked as "1+", the second negative electrode terminal 107 marked as "2−" and the second positive electrode terminal 108 marked as "2+" on the right side are connected, which is the four electrode terminals used to connect with the electrodes of the second battery pack 20 are all electronically connected. Further, the second positive electrode terminal 104 marked as "2+" on the left side and the second positive terminal 108 (total positive) marked as "2+" on the right side are connected, by this, the first battery pack 10 directly outputs an output voltage of 48V.

Figure 2:
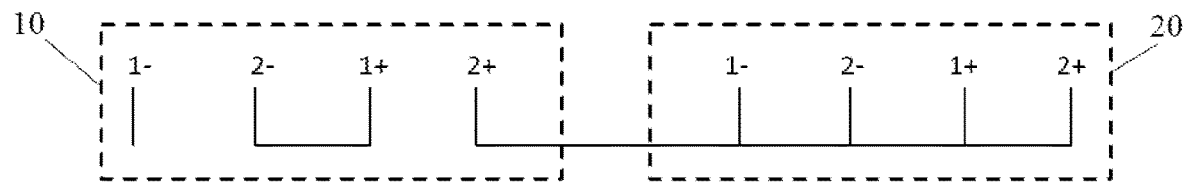
FIG. 2(a) to FIG. 2(c) show three working states of the two battery packs of a power tool system disclosed.
Figure 2:
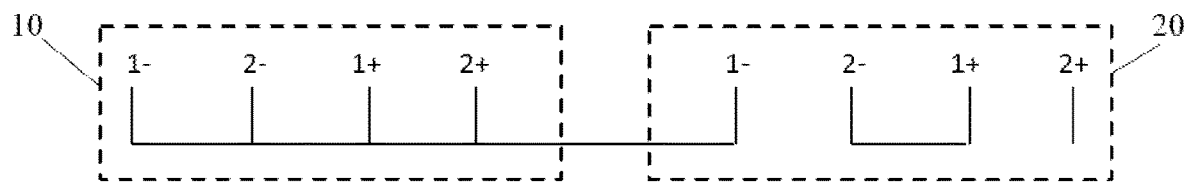
Figure 2:
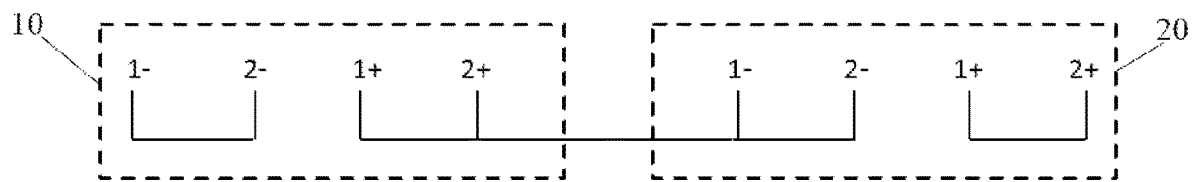

As shown in FIG. 2(*b*), FIG. 2(*b*) shows the second working state, the power tool 100 is only installed with the second battery pack 20, the second negative electrode terminal 107 marked as "2−" on the right side is connected with the first positive electrode terminal 106 marked as "1+" on the right side, which is to connect the second negative electrode and the first positive electrode of the second battery pack 20, which makes the two battery groups of the second battery pack 20 connect in series, the output voltage of the second battery pack 20 is now 48V; the first negative electrode terminal 101 marked as "1−", the first positive electrode terminal 102 marked as "1+", the second negative electrode terminal 103 marked as "2−" and the second positive electrode terminal 104 marked as "2+" on the left side are connected, which is the four electrode terminals of the first battery pack 10 are all electronically connected. Further, the first negative electrode terminal 105 marked as "1−" on the right side and the first negative electrode terminal 101 (total negative) marked as "1−" on the left side are connected, by this, the second battery pack 20 directly outputs the voltage to the outside, the output voltage is 48V.

As shown in FIG. 2(*c*), FIG. 2(*c*) shows the third working state, the power tool 100 is installed with both the first battery pack 10 and the second battery pack 20, the first negative electrode terminal 101 marked as "1−" on the left side is connected with the second negative electrode terminal 103 marked as "2−", the first positive electrode terminal 102 marked as "1+" is connected with the second positive electrode terminal 104 marked as "2+", which connects the first negative electrode and the second negative electrode, and connects the first positive electrode and the second positive electrode of the first battery pack 10, which makes the two battery groups of the first battery pack 10 connected parallelly, the output voltage of the first battery pack 10 is now 24V. The first negative electrode terminal 105 marked as "1−" on the right side is connected with the second negative electrode terminal 107 marked as "2−", the first positive electrode terminal 106 marked as "1+" is connected with the second positive electrode terminal 108 marked as "2+", which is to the connection of the first negative electrode and the second negative electrode, and the connection of the first positive electrode and the second positive electrode of the second battery pack 20, which makes the two battery groups of the second battery pack 20 connected parallelly, the output voltage of the second battery pack 20 is now 24V. Further, the first positive electrode terminal 102 marked as "1+" and the second positive electrode terminal 104 marked as "2+" on the left side, and the first negative electrode terminal 105 marked as "1−" and the second negative electrode terminal 107 marked as "2−" on the right side are connected, which is the positive electrode of the first battery pack 10 is connected with the negative electrode of the second battery pack 20, which leads to a series connection of the first battery pack 10 and the second battery pack 20, this forms a work state in which the two battery groups in each of the battery packs 10 and 20 are connected parallelly, and the two battery pack 10 and 20 are connected in series, the total output voltage is 48V.

As shown in FIG. 1 to FIG. 2(*c*), under the above-mentioned three working states, using either one of the first batter pack 10 or the second battery pack 20 can provide the voltage of 48V, using both battery packs can also provide the voltage of 48V, which ensures the power tool 100 to operate properly under the rated voltage of 48V. In detail, while the power tool 100 is installed with dual battery packs, the two battery groups in each battery pack are connected parallelly to provide a low voltage output, the two battery packs are connected in series; while the power tool is installed with a single battery pack, the two battery groups in the single battery pack are in series to provide a high voltage output, the power tool system can adjust the connection state of the two battery groups in the battery pack according to the installation state of the battery packs.

As shown in FIG. 1, the first battery pack 10 and the second battery pack 20 are double voltage battery packs, which outputs voltage of 48V while singly used, while both in use, each of the battery packs outputs voltage of 24V and connected in series to the other; as an alternative, the first battery pack 10 and the second battery pack 20 might also be single voltage battery packs, which outputs voltage of 48V while singly used, while both in use, each battery pack is connected in parallel to the other and outputs voltage of 48V.

This disclosure also provides a number of switches, these switches are set in between the electrode terminals, the adjustment and control of the connection states of the two battery groups in the battery packs can be realized via controlling the on and off of the switches, which leads to the switching and controlling of the above-mentioned three working states. This disclosure provides a number of embodiments for setting the switch components, and will be respectively described below.

Embodiment 1

Figure 4:
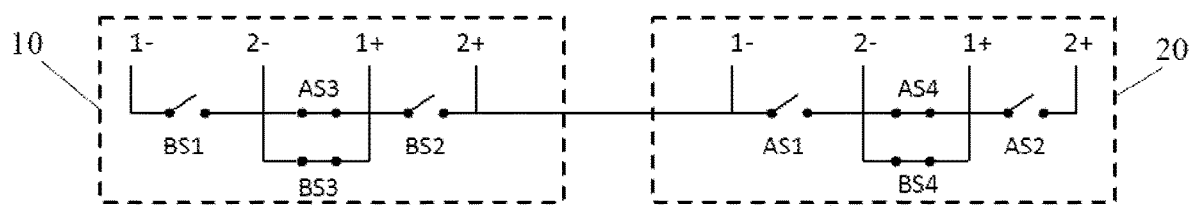
FIG. 4 is a connection diagram of the switches of the power tool in an initial state according to the first embodiment disclosed.

As shown on the left side of FIG. 4, the power tool 100 is set with the first group of control switches controlling the first battery pack, including the first switch BS1 set between the first negative electrode terminal 101 marked as "1−" and the second negative electrode terminal 103 marked as "2−", the second switch BS2 set between the first positive electrode terminal 102 marked as "1+" and the second positive electrode terminal 104 marked as "2+", and two third switches AS3, BS3 set between the second negative electrode terminal 103 marked as "2−" and the first positive electrode terminal 102 marked as "1+".

As shown on the right side of FIG. 4, the power tool 100 is set with the second group of control switches controlling the second battery pack, including the fourth switch AS1 set between the first negative electrode terminal 105 marked as "1−" and the second negative electrode terminal 107 marked as "2−", the fifth switch AS2 set between the first positive electrode terminal 106 marked as "1+" and the second positive electrode terminal 108 marked as "2+", and two sixth switches AS4, BS4 set between the second negative electrode terminal 103 marked as "2−" and the first positive electrode terminal 102 marked as "1+".

As shown in FIG. 1 and FIG. 4, the first group of switches is used to adjust the connection state of the electrode terminals in the first battery pack, the second group of switches is used to adjust the connection state of the electrode terminals in the second battery pack. FIG. 4 shows the initial state of each switch, in which the first switch BS1 and the second switch BS2 are normally open switches, that is to say the initial status is a disconnected state, the third switch AS3 and BS3 are normally closed switches, that is to say the initial status is in a conducting state. The fourth switch AS1 and the fifth switch AS2 are normally open switches, the sixth switches AS4 and BS4 are normally closed switches. The second positive electrode terminal 104 marked as "2+"

of the first battery pack 10 is directly connected with the first negative electrode terminal 105 marked as "1−". That is to say, when the switches stay in the initial status without switched, the first battery pack 10 and the second battery pack 20 are connected in series, and the two battery groups in each of the battery packs 10 and 20 are connected parallelly.

For further explanation, normally closed switch refers to that in the initial status, the two contact parts thereof are in the contact state so as to realize that the electrodes electrically connected with the two contact parts are in the connected state, and the electrical connection state of the two contact parts can be changed through the action of external matter, so that the two contact parts switch from the contact state to the disconnected state, for example, normally closed terminal. Normally open switch refers to that in the initial status, the two contact parts are in the disconnected state so as to realize that the electrodes electrically connected with the two contact parts are in an open state, and the electrical disconnection state of the two contact parts can be changed through the action of external matter, so that the two contact parts switch from the disconnected state to the contact state, for example, normally open terminal. Therefore, normally open switches are not limited to normally open terminals, normally close switches are not limited to normally close terminals, any implementation capable of realizing the same function is under the protection of this disclosure.

Figure 3:
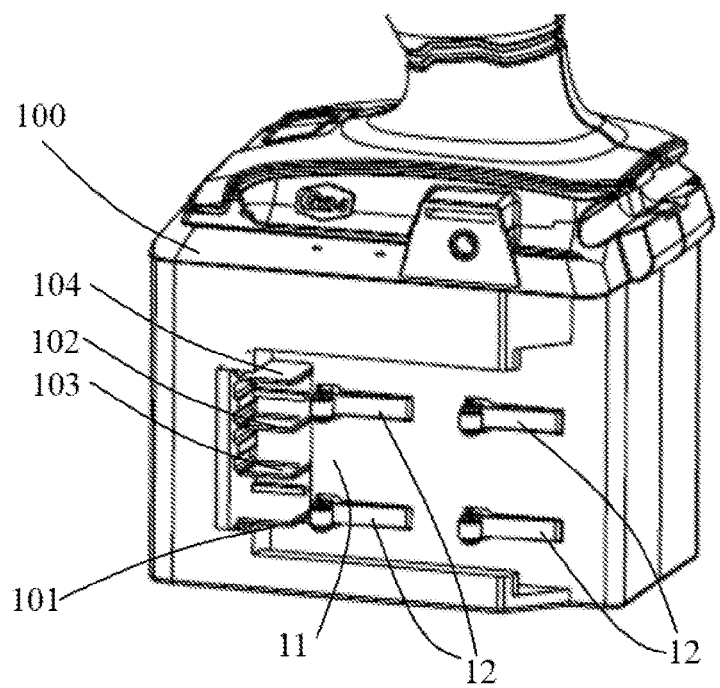
FIG. 3(a) to FIG. 3(b) are partial perspective views of a power tool according to the first embodiment disclosed.
Figure 3:
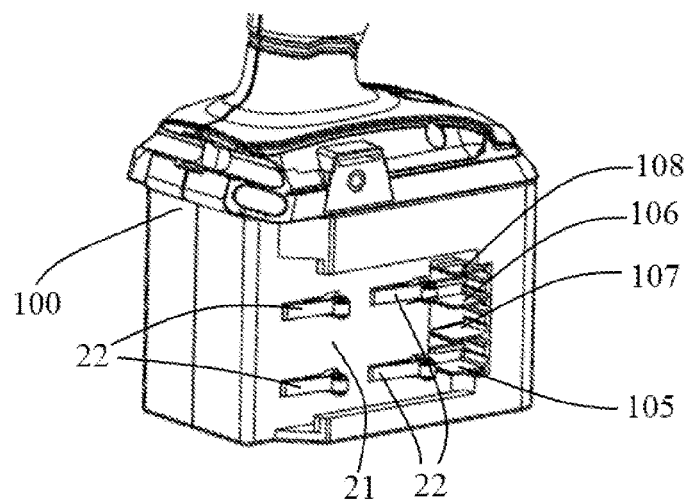

As shown in FIGS. 3(a) to 3(b), four terminals 12 corresponding to the fourth switch AS1, the fifth switch AS2, the third switch AS3 and the sixth switch AS4 are set in the first slot 11, and are triggered by the first battery pack 10. Four terminals 22 corresponding to the first switch BS1, the second switch BS2, the third switch BS3 and the sixth switch BS4 are set in the second slot 12, switched by the second battery pack 20.

Figure 5:
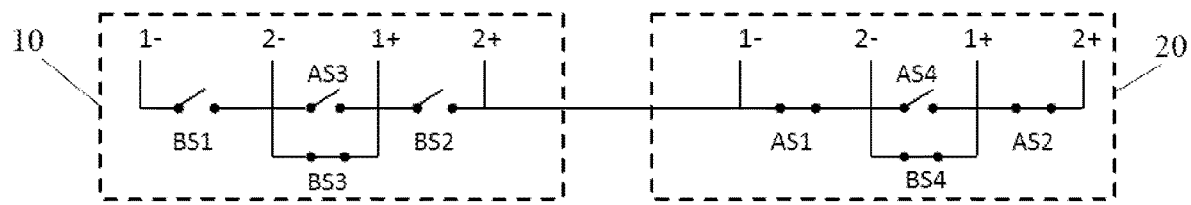
FIG. 5(a) to FIG. 5(c) are the connection diagrams of the switches corresponding to the three working states according to the first embodiment disclosed.
Figure 5:
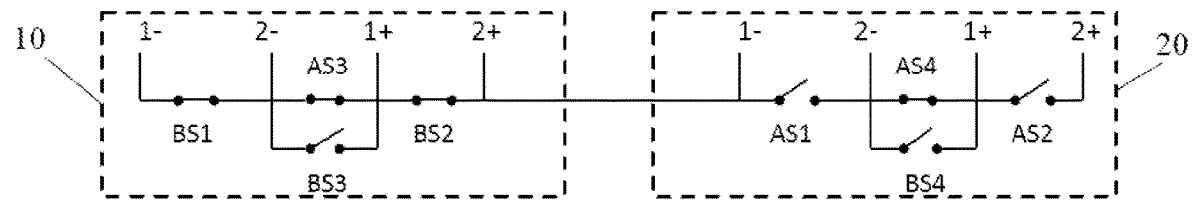
Figure 5:
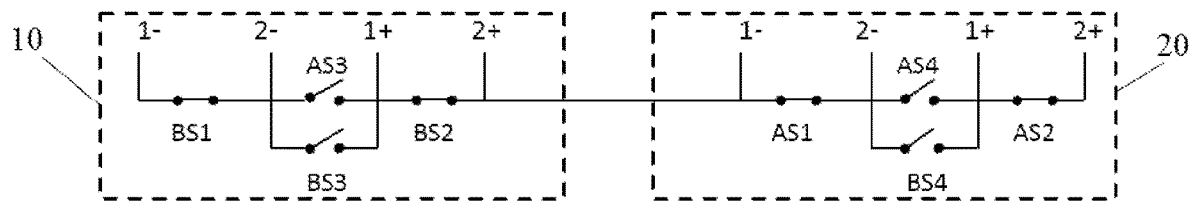

FIGS. 4 to 5(c), show the connection states of each switch respectively in the three working states. FIG. 5(a) refers to the first working state, only the first battery pack 10 is installed in the first slot 11, after inserting the first battery pack 10, the third switch AS3 and the sixth switch AS4 are switched from close on to off, the fourth switch AS1 and the fifth switch AS2 are switched from off to close on. According to the right side of the FIGURE, in the four switches of the four terminals related to the second battery pack 20, although the sixth switch AS4 is off, but the fourth switch AS1 and the fifth switch AS2 are close on, the sixth switch BS4 keeps close on, which makes the four terminals related to the second battery pack 20 all connected. According to the left side of the FIGURE, in the four switches of the four terminals related to the first battery pack 10, only the third switch AS3 is switched from close on to off, but due to another unchanged third switch BS3, the connection status the four terminals related to the first battery pack stays unchanged, the two battery groups of the first battery pack are connected in series, the first battery pack 10 outputs a voltage of 48V.

Similar to FIG. 5(a), FIG. 5(b) refers to the second working state, only the second battery pack 20 is installed in the second slot 21, after inserting the second battery pack 20, the third switch BS3 and the sixth switch BS4 are switched from close on to off, the first switch BS1 and the third switch BS2 are switched from off to close on. According to the right side of the FIGURE, in the four switches of the four terminals related to the second battery pack 20, only the sixth switch BS4 is switched from close on to off, but due to another unchanged sixth switch AS4, the connection status the four terminals related to the second battery pack 20 stays unchanged, the two battery groups of the second battery pack 20 are connected in series. According to the left side of the FIGURE, in the four switches of the four terminals related to the first battery pack 10, although the third switch BS3 is off, but the first switch BS1 and the second switch BS2 are close on, the third switch AS3 keeps close on, which makes the four switches of the four terminals related to the first battery pack 10 all connected, the second battery pack 20 outputs a voltage of 48V.

FIG. 5(c) refers to the third working state, the first battery pack 10 and the second battery pack 20 are respectively installed in the first slot 11 and the second slot 12, after inserting the first battery pack 10, the third switch AS3 and the sixth switch AS4 are switched from close on to off, the fourth switch AS1 and the fifth switch AS2 are switched form off to close on; after inserting the second battery pack, the third switch BS3 and the sixth switch BS4 are switched from close on to off, the first switch BS1 and the second switch BS2 are switched from off to close on. Therefore, the two battery groups of the first battery pack 10 are connected parallelly, the two battery groups of the second battery pack 20 are connected parallelly, the first battery pack 10 and the second battery pack 20 are connected in series, the total output voltage is 48V.

As shown in FIGS. 5(a) to 5(c), in the above-mentioned switch settings, the first switch BS1 and the second switch BS2 are used to parallelly connect the two battery groups of the first battery pack 10, the fourth switch AS1 and the fifth switch AS2 are used to parallelly connect the two battery groups of the second battery pack 20, which can be referred as parallel switches, in this embodiment the above-mentioned switches are normally open switches. The two third switches AS3 and BS3 are used to connect the two battery groups of the first battery pack 10 in series, the two sixth switches AS4 and BS4 are used to connect the two battery groups of the second battery pack 20 in series, which can be referred as series switches, in this embodiment the above-mentioned switches are normally closed switches. In the same circuit section, if the series switches and the parallel switches are in the close on state at the same time, there will be a short circuit. In the four switches controlling the first battery pack 10, the two parallel switches BS1 and BS2 are switched by the second battery pack 20, the series switch BS3 is switched by the second battery pack 20, the other series switch AS3 is switched by the first battery pack 10 itself. In the four switches controlling the second battery pack 20, the two parallel switches AS1 and AS2 are switched by the first battery pack 10, the series switch AS4 is switched by the first battery pack 10, the other series switch BS4 is switched by the second battery pack 20.

To sum up, only when both battery packs are installed, both series switches for each battery pack are switched off, while both parallel switches are switched to close on, so that the two battery groups for each battery pack are switched in parallel. If a single battery pack is installed, although the two parallel switches of the other battery pack are closed and conducted, but without the other battery pack itself to switch off the series switches, the circuit of the other battery pack includes both parallel and series connection, which is the four electrode terminals of the other battery pack are all connected to each other, similar to a short circuit. Without the installation of the other battery pack, the two parallel switches of the installed battery pack stay disconnected, the one of the two series switches that switched by the installed battery pack itself is switched off, but the one series switch that switched by the other battery pack stays connected in series, thus, the two battery groups of the installed battery pack stays in series connected.

The above-mentioned switch setting can realize the following functions: the installing of a single battery pack can make all the electrode terminals corresponding to another battery pack electrically connected to each other, and the output voltage of the single battery pack is in a high voltage state; the installing of two battery packs enables each battery pack to switch to a low voltage state, so that the two battery packs are connected in series to form a high voltage output. Each battery pack corresponds to two series switches. Only when the two battery packs are installed into the corresponding slot, can both series switches be switched off, so that the two battery groups in each battery pack are connected parallelly. If one battery pack is already in use and another battery pack needs to be installed, the power tool can be stopped first and then install the other battery pack. The two battery packs are connected in series to output a 48V voltage.

In this embodiment, all the switches use mechanic switches, need to be switched by the action of installing the battery pack.

Embodiment 2

Figure 6:
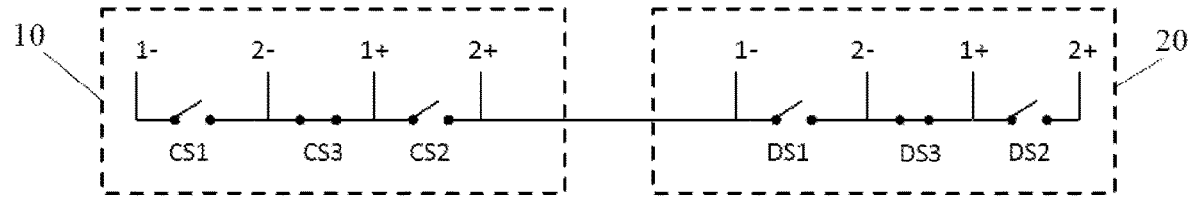
FIG. 6 is a connection diagram of the switches of a power tool in an initial state according to the second embodiment disclosed.

As shown in FIG. 6, this embodiment is different from the embodiment 1 by using electronic switches, which capable the combination of the two series switches in embodiment 1 into one series switch. The first control switch group for adjusting the connection state of the four electrode terminal of the first battery pack 10 includes two parallel switches CS1, CS2 and a series switch CS3, the parallel switch CS1 connects the first negative terminal 101 and the second negative terminal 103, the parallel switch CS2 connects the first positive terminal 102 and the second positive terminal 104, the series switch CS3 connects the second negative terminal 103 and the first positive terminal 102. The second control switch group for adjusting the connection state of the four electrode terminal of the second battery pack 20 includes two parallel switches DS1, DS2 and a series switch DS3, the parallel switch DS1 connects the first negative terminal 105 and the second negative terminal 107, the parallel switch DS2 connects the first positive terminal 106 and the second positive terminal 108, the series switch DS3 connects the second negative terminal 107 and the first positive terminal 106. The first battery pack 10 and the second battery pack 20 are connected in series. In which each parallel switch of CS1, CS, DS1, DS2 is a normally open switch, the initial status is off, each series switch of CS3, DS3 is a normally closed switch, the initial status is close on, that is to say, when the switches stay in the initial status without switched, the first battery pack 10 and the second battery pack 20 are connected in series, and the two battery groups in each of the battery packs 10 and 20 are connected in series.

Figure 7:
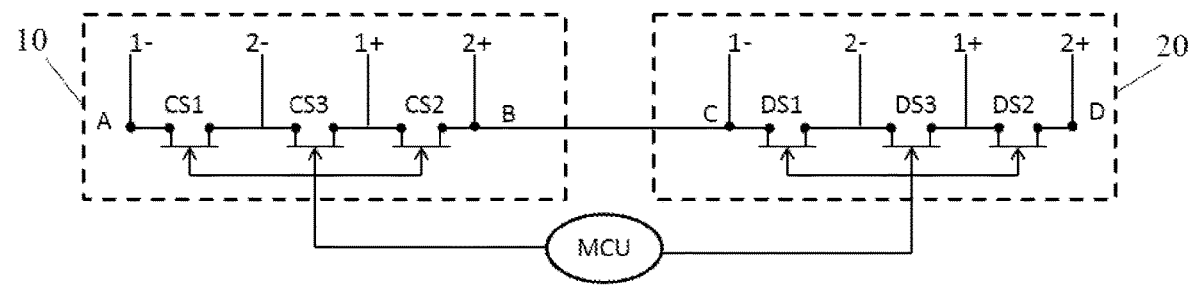
FIG. 7 is a connection diagram of the switches and the micro control unit according to the second embodiment disclosed.

As shown in FIGS. 6 to 7, the power tool 100 is also set with a micro control unit (MCU), all the switches are switched under the control of the micro control unit (MCU), The installing of the first battery pack 10 and the second battery pack 20 will not directly occur any switching of the switches, not any switch control terminal is set in the slot 11 and 21.

Figure 8:
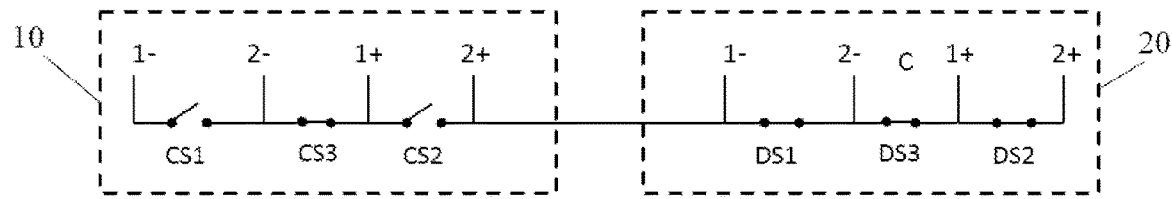
FIG. 8(a) to FIG. 8(c) are the connection diagrams of the switches corresponding to the three working states according to the second embodiment disclosed.
Figure 8:
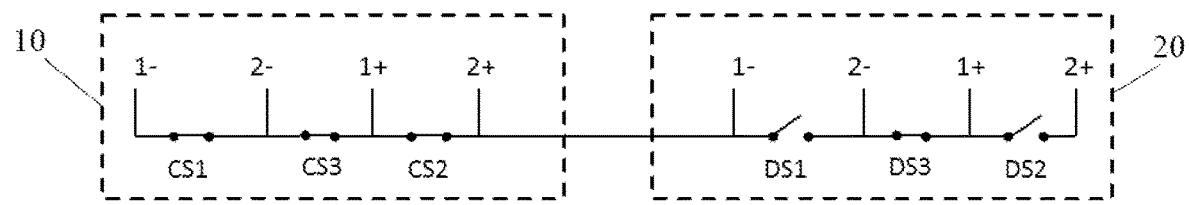
Figure 8:
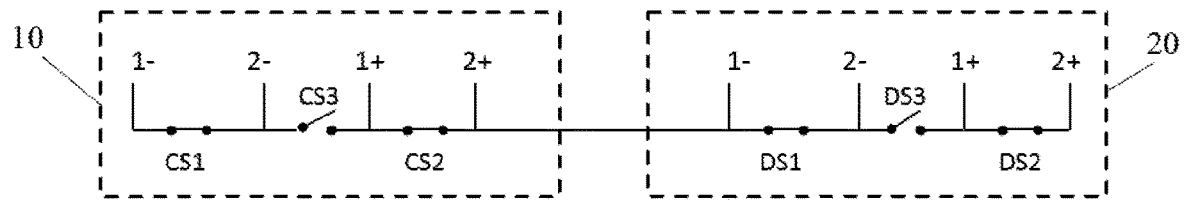

As shown in FIG. 8(a), when the micro control unit (MCU) is powered on, it detects the first voltage between point A and B on two ends of the first battery pack 10 and the second voltage between point C and D on two ends of the second battery pack20, if the first voltage is detected as 48V, and the second voltage is 0V, this indicates the power tool is only installed with the first battery pack 10, which refers to the first working state, the micro control unit (MCU) closes on the parallel switches DS1 and DS2, the series switch DS3 stays on, which makes four electrode terminal related to the second battery pack 20 all electrically connected to each other, similar to a short circuit; the switches CS1, CS2, CS3 related to the first battery pack 10 stay unchanged, that is to say the two battery groups in the first battery pack 10 stay connected in series, the output voltage is 48V.

As shown in FIG. 8(b), when the micro control unit (MCU) detects the first voltage is 0V, and the second voltage is 48V, this indicates the power tool is only installed with the second battery pack 20, which refers to the second working state, the micro control unit (MCU) closes on the parallel switches CS1 and CS2, the series switch CS3 stays on, which makes four electrode terminal related to the first battery pack 10 all electrically connected to each other, similar to a short circuit; the switches DS1, DS2, DS3 related to the second battery pack 20 stay unchanged, that is to say the two battery groups in the second battery pack 20 stay connected in series, the output voltage is 48V.

As shown in FIG. 8(c), when the micro control unit (MCU) detects the first voltage and the second voltage are both 48V, this indicates the power tool is installed with both the first battery pack 10 and the second battery pack 20, which refers to the third working state, the micro control unit (MCU) switches the series switches CS3 and DS3 off, then close the parallel switches CS1, CS2 and DS1, DS2 on, that is to say the two battery groups in each of the first battery pack 10 and the second battery pack 20 are switched to parallel connection, the first battery pack 10 and the second battery pack 20 are connected in series, the total output voltage is 48V.

Embodiment 3

Figure 9:
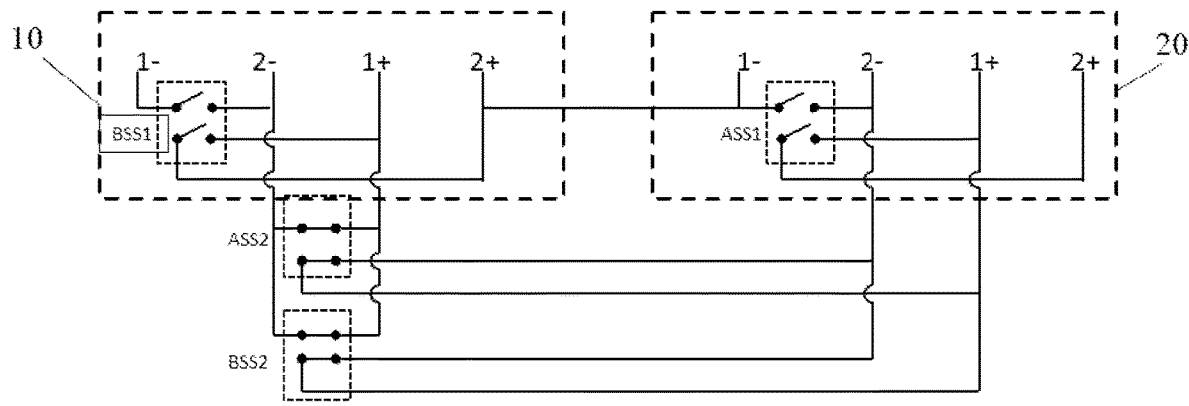
FIG. 9 is a connection diagram of the switches of a power tool in an initial state according to the third embodiment disclosed.

As shown in FIG. 9, this embodiment is similar to the embodiment 1, the difference is, all the switches in the embodiment 1 are single-pole single-throw switches, this embodiment use double-pole double-throw switches instead. Double-pole double-throw switch equals to including two switches which can be simultaneously switched by one action.

As shown in FIG. 9, the embodiment includes two parallel switches ASS1, BSS1 and two series switches ASS2, BSS2, the parallel switches ASS1, BSS1 and to series switches ASS2, BSS2 are all double-pole double-throw switches. The parallel switch BSS1 corresponds to the first switch BS1 and the second switch BS2 in embodiment 1, respectively connects the first negative terminal 101 marked as "1−" and the second negative terminal 103 marked as "2−", the first positive terminal 102 marked as "1+" and the second positive terminal 104 marked as "2+", in the left side, which is used to parallelly connect the two battery groups in the first battery pack 10. The parallel switch ASS1 corresponds to the fourth switch AS1 and the fifth switch AS2 in embodiment 1, respectively connects the first negative terminal 105 marked as "1−" and the second negative terminal 107 marked as "2−", the first positive terminal 106 marked as "1+" and the second positive terminal 108 marked as "2+", in the right side, which is used to parallelly connect the two battery groups in the second battery pack 20.

As shown in FIG. 9, the series switch ASS2 corresponds to the third switch AS3 and the sixth switch AS4 in embodiment 1, respectively connects the second negative terminal 107 marked as "2−" and the first positive terminal 106 marked as "1+", the second negative terminal 103 marked as "2−" and the first positive terminal 102 marked as "1+", which is used to respectively control one series circuit between the first battery pack 10 and the second battery pack 20. The series switch BSS2 corresponds to the third switch BS3 and the sixth switch BS4, with the same connecting method of the series switch ASS2, respectively connects the second negative terminal 107 marked as "2−" and the first positive terminal 106 marked as "1+", the second negative terminal 103 marked as "2−" and the first positive terminal 102 marked as "1+", which is used to control the other series circuit between the first battery pack 10 and the second battery pack 20. In which the parallel switches ASS1 and BSS1 are normally open switches, the initial status is off, the series switches ASS2 and BSS2 are normally closed switches, the initial status is close on, that is to say, when the switches stay in the initial status without switched, the first battery pack 10 and the second battery pack 20 are connected in series, and the two battery groups in each of the battery packs 10 and 20 are connected in series, same as in the embodiment 1.

Figure 10:
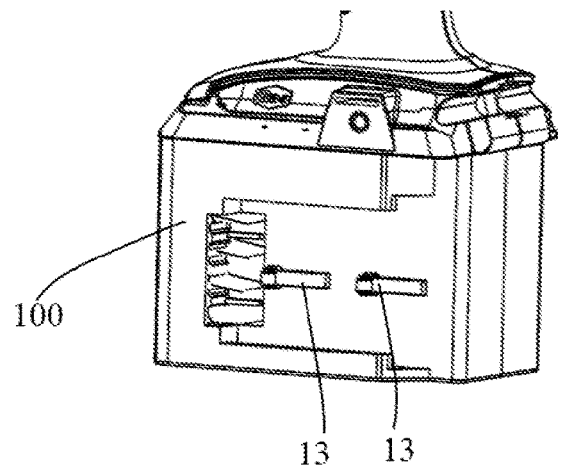
FIG. 10 is a partial perspective view of the power tool according to the third embodiment disclosed.

As shown in FIG. 10, the first slot 11 for holding the first battery pack 10 is set with two switch terminals 13 respectively corresponding to the series switch ASS1 and ASS2, the second slot 12 for holding the second battery pack 20 is set with two switch terminals (not shown in the FIGURE) respectively corresponding to the parallel switch BSS1 and the series switch BSS2.

Figure 11:
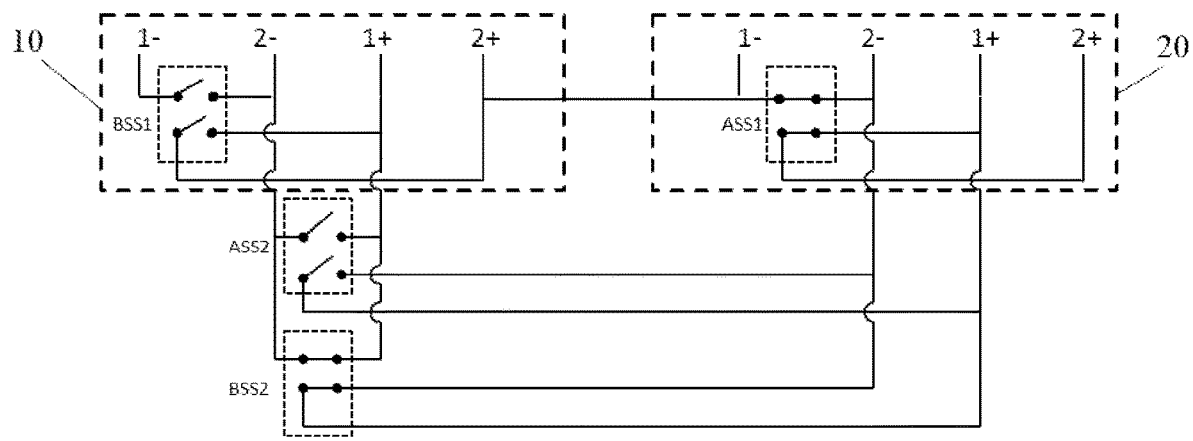
FIG. 11(a) to FIG. 11(c) are the connection diagrams of the switches corresponding to the three working states according to the third embodiment disclosed.
Figure 11:
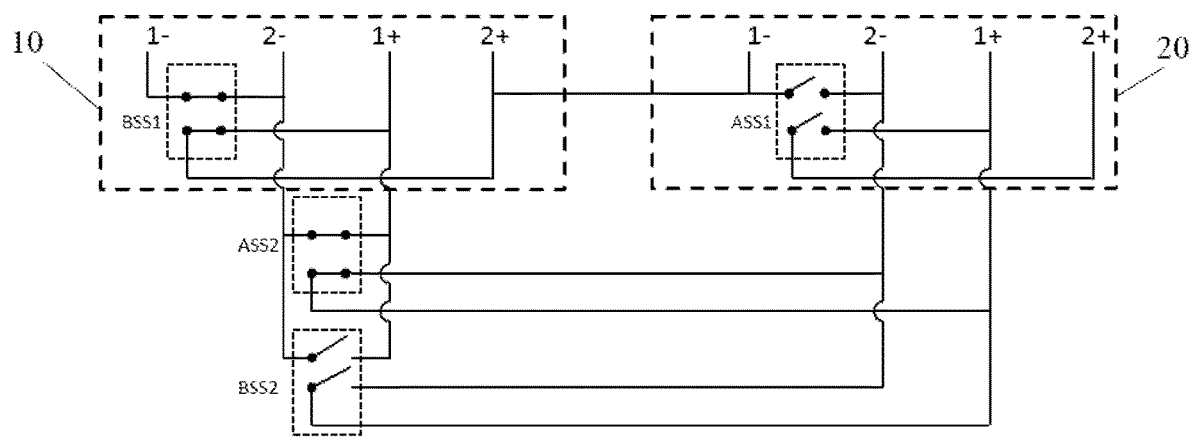
Figure 11:
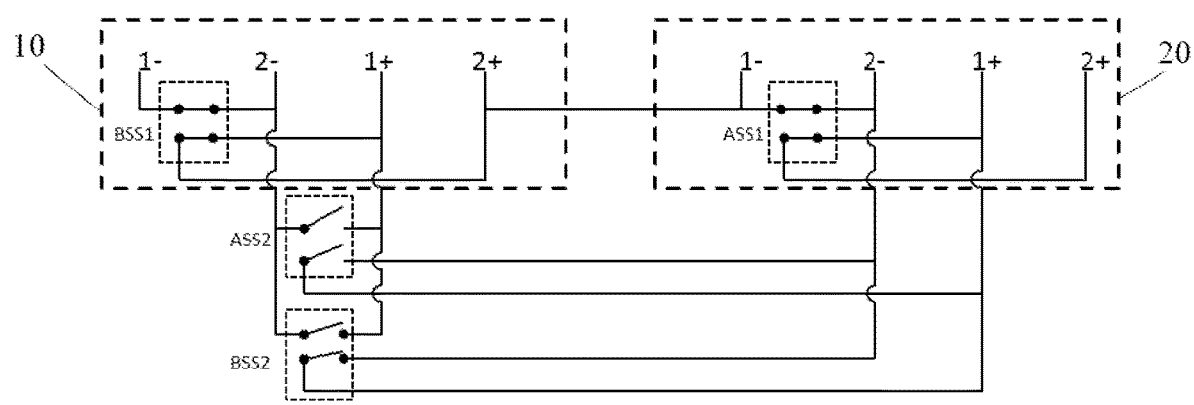

As shown in FIG. 11(a), while only the first battery pack 10 is installed in to first slot 11, the series switch ASS2 is switched off, the parallel switch ASS1 is switched to close on. The parallel switch BSS1 stays off, the series switch BSS2 stays close on, thus the four electrode terminals corresponding to the second battery pack 20 are electronically connected to each other, the detail circuit switch process is described in the embodiment 1, reference is made to the relevant content in the embodiment 1, which will not be repeated here. The two battery groups in the first battery pack 10 stay connected in series, the output voltage is 48V.

As shown in FIG. 11(b), while only the second battery pack 20 is installed in to second slot 12, the series switch BSS2 is switched off, the parallel switch BSS1 is switched to close on. The parallel switch ASS1 stays off, the series switch ASS2 stays close on, thus the four electrode terminals corresponding to the first battery pack 10 are electronically connected to each other, reference is made to the relevant content in the embodiment 1, which will not be repeated here. The two battery groups in the second battery pack 20 stay connected in series, the output voltage is 48V.

As shown in FIG. 11(c), the first battery pack 10 is installed in to first slot 11, the series switch ASS2 is switched off, the parallel switch ASS1 is switched to close on; simultaneously the second battery pack 20 is installed in to second slot 12, the series switch BSS2 is switched off, the parallel switch BSS1 is switched to close on. Therefore, the first battery pack 10 and the second battery pack 20 are connected in series, the two battery groups in each of the first battery pack 10 and the second battery pack 20 are connected parallelly, the total output voltage is 48V.

Embodiment 4

In the embodiment 1, each slot is set with four switch terminals 12, 22, the switches are switched by pressing the corresponding switch terminals 12, 22 via the installing the battery packs 10 and 20 in the slots. In this embodiment, the switch terminals are substituted by a mechanical structure to realize the control. The difference between the embodiment 1 and 3 is the detail method of switching the switches, the other parts including detail schematic circuit, methods of switch setting and switching are all the same with the embodiment 1, reference is made to the relevant content in the embodiment 1, which will only be briefly described below.

As shown in FIGS. 12 to 15, one of the slots is set with a first male plug-in component 14, the first male plug-in component 14 includes an insulative body and four electrode terminals fixed on the insulative body, including the first negative electrode terminal 101, the first positive electrode terminal 102, the second negative electrode terminal 103 and the second positive electrode terminal 104, which are respectively connected with the first negative electrode, the first positive electrode, the second negative electrode and the second positive electrode of the first battery pack 10 correspondingly. The other slot is set with a second male plug-in component 24, the second male plug-in component 24 includes an insulative body and four electrode terminals fixed on the insulative body, including the first negative electrode terminal 105, the first positive electrode terminal 106, the second negative electrode terminal 107 and the second positive electrode terminal 108, which are respectively connected with the first negative electrode, the first positive electrode, the second negative electrode and the second positive electrode of the second battery pack 20 correspondingly.

As shown in FIG. 4 to FIG. 5, the power tool 100 is set with four control switches controlling the first battery pack 10, including two parallel switches BS1, BS2 and two series switches AS3, BS3; and four control switches controlling the second battery pack 20, including two parallel switches AS1, AS2 and two series switches AS4, BS4. The parallel switches BS1, BS2, AS1, AS2 control the parallel connection of the battery groups in each of the battery packs 10, 20 via the connection with the above-mentioned electrode terminals, the series switches AS3, BS3, AS4, BS4 control the series connection of the battery groups in each of the battery packs 10, 20 via the connection with the above-mentioned electrode terminals. All the parallel switches BS1, BS2, AS1, AS2 are normally open switches, and all the series switches AS3, BS3, AS4, BS4 are normally closed switches. That is to say, while each switch stays in the initial status without switched, the first battery pack 10 and the second battery pack 20 are connected in series, and the two battery groups in each of the battery packs 10, 20 are connected in series. The first battery pack 10 controls the switching of the parallel switches AS1, AS2 and the series switches AS3, AS4, the second battery pack 20 controls the switching of the parallel switches BS1, BS2 and the series switches BS3, BS4. When both of the battery packs 10 and 20 are installed, the two battery groups in each battery pack 10, 20 are switched to parallel connection, the two battery packs 10, 20 totally output a voltage of 48V. When a single battery pack is installed, the two battery groups in the battery pack are connected in series, the single battery pack outputs a voltage of 48V. The connection state of each switch and the switching of the three working state of the power tool 100 can be referred from the corresponding content in the embodiment 1.

The structure of the gang switches and the connection of each electrode terminal are described below in detail.

Figure 12:
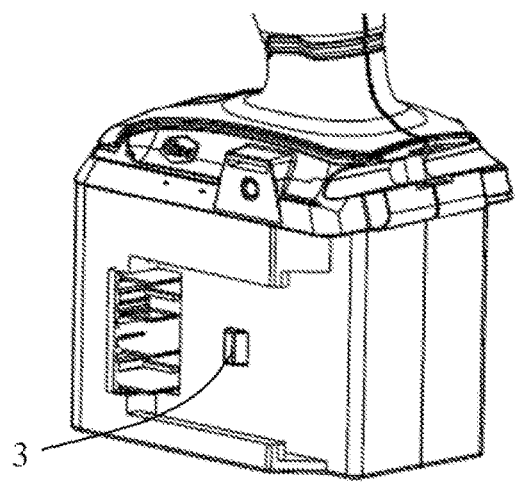
FIG. 12 is a partial perspective view of a power tool according to the fourth embodiment disclosed.
Figure 13:
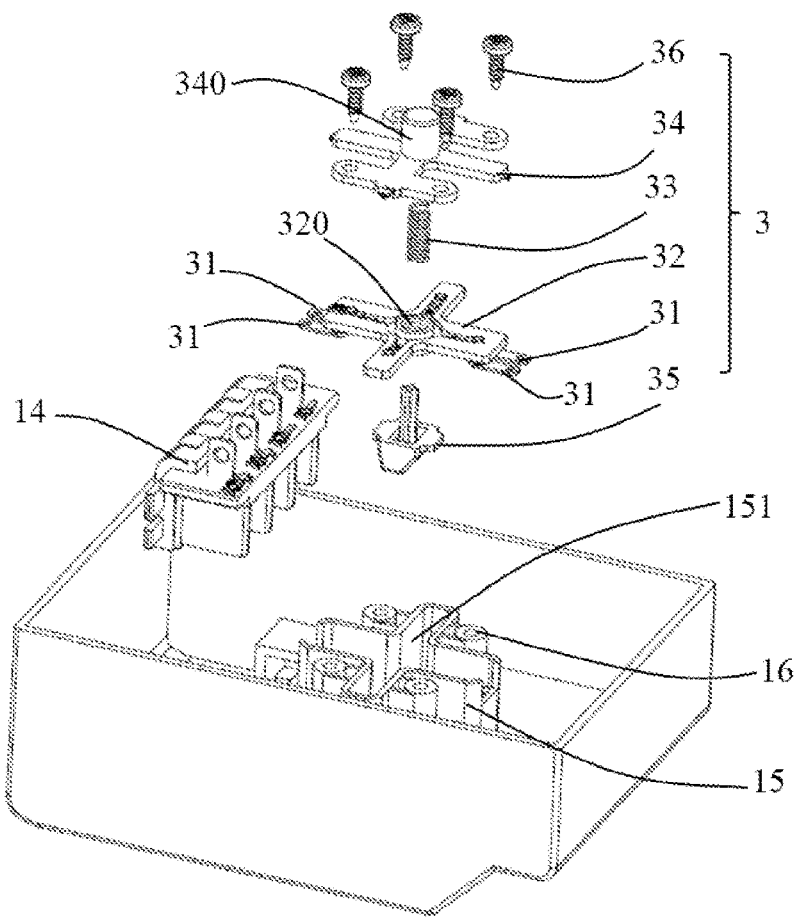
FIG. 13 is a partial perspective explosion view of the power tool according to the fourth embodiment disclosed.
Figure 14:
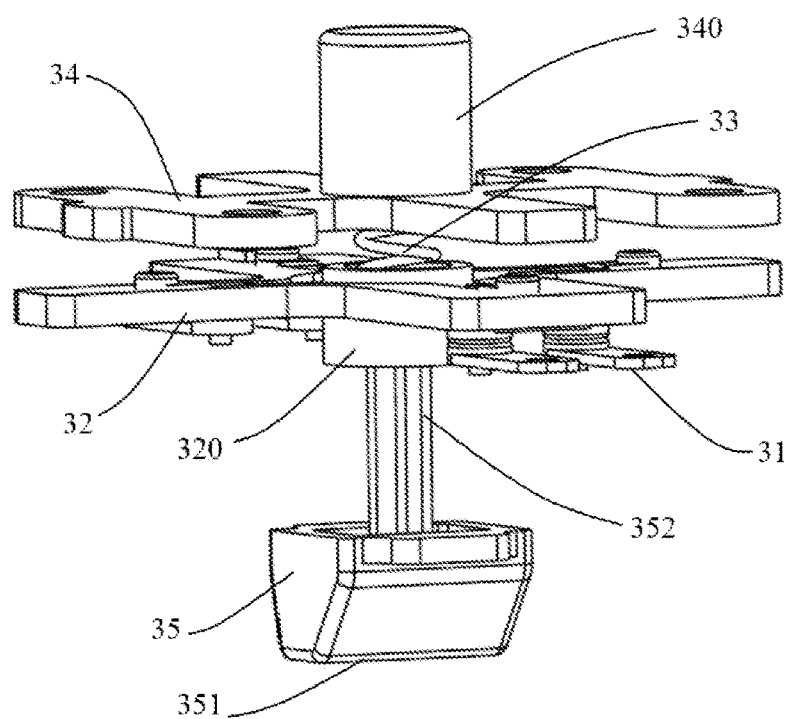
FIG. 14 is a perspective explosion view of the gang switch of the power tool according to the fourth embodiment disclosed.
Figure 15:
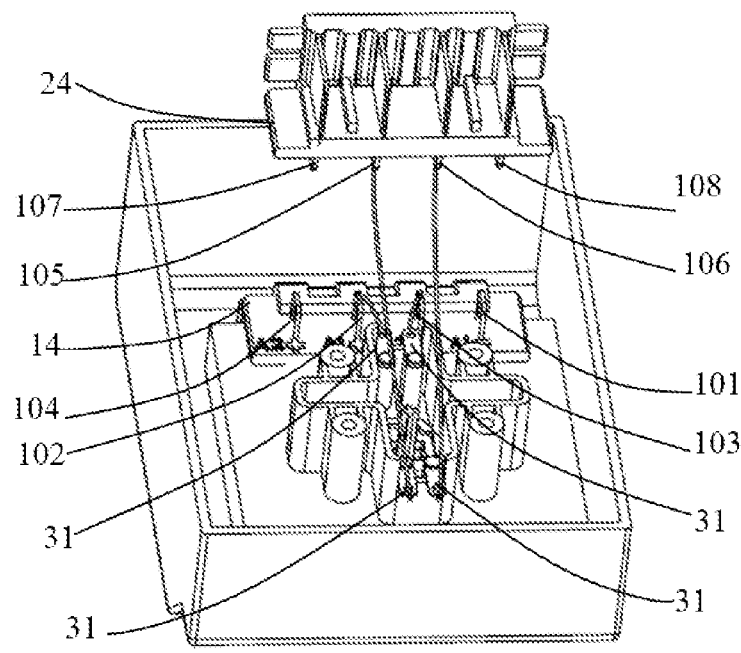
FIG. 15 is a wiring diagram of the contact pieces of the gang switch.
Figure 16:
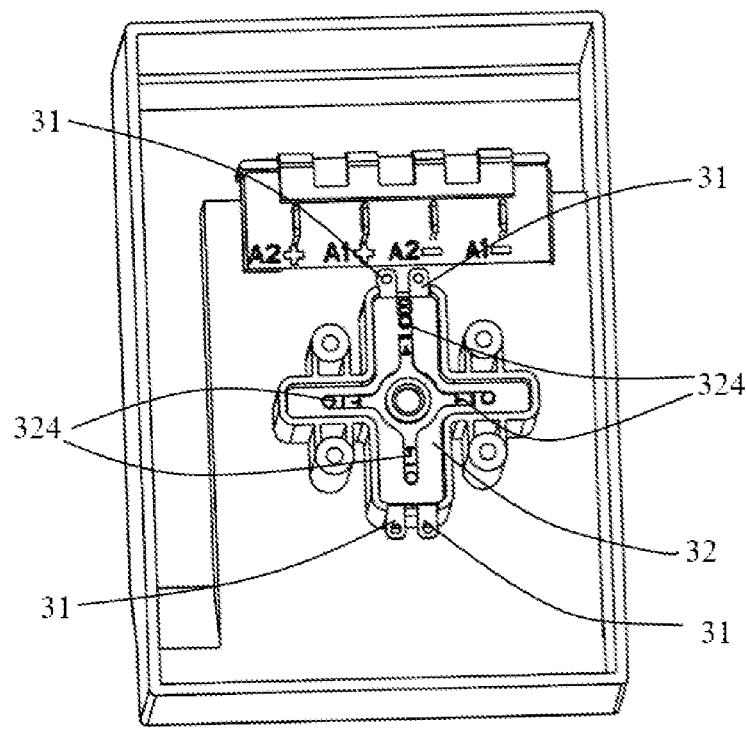
FIG. 16 is an assembly diagram of the linkage assembly of the gang switch.
Figure 17:
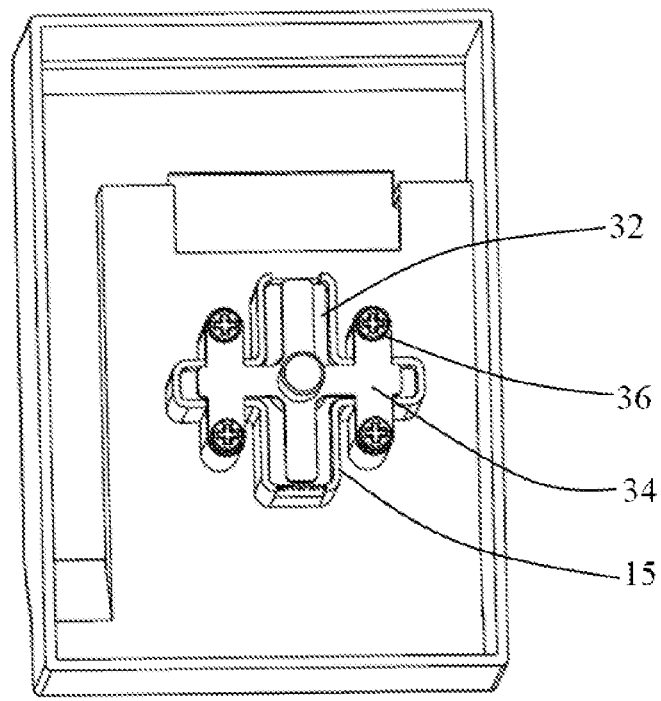
FIG. 17 is an assembly diagram of the platen assembly of the gang switch.
Figure 18:
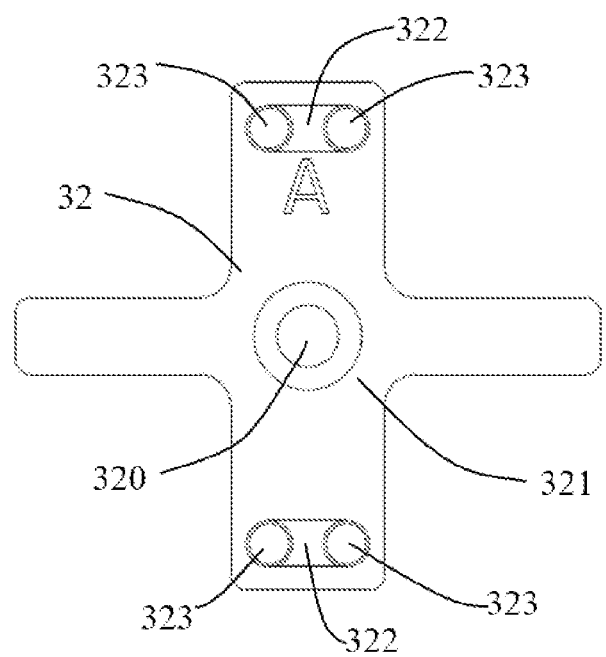
FIG. 18 is a plane view of the linkage assembly of the gang switch.

As shown in FIG. 12 to FIG. 14, the power tool 100 in this embodiment is provided with two gang switches 3, respectively set on the inner side of the two slots. The gang switches 3 are set in the cavity on the back of the slots of the power tool 100. The gang switches include contact piece 31, linkage assembly 32, elastic part 33, platen assembly 34, inching button 35 and a plurality of screw nails 36. The inching button 34 includes a head part 351 and a rod part 352, the head part 351 partially protrudes through the bottom wall of the corresponding slot into the slot, to be switched by either the first battery pack 10 or the second battery pack 20. The structure of the two gang switches 3 are the same. The following will take one gang switch 3 as an example to explain.

As shown in FIG. 13 to FIG. 14, the linkage assembly 32 and the platen assembly 34 are set roughly parallel to each other, the elastic part 33 is set between the linkage assembly 32 and the platen assembly 34, the platen assembly 34 and the linkage assembly 32 are respectively set with an accommodating cavity 340,320, to avoid the elastic part 33 being detached. The head component 351 of the inching button 35 is pressed to lead the rod part 352 to push the linkage assembly 32 towards the platen assembly 34, and press the elastic part 33. The linkage assembly 32 is roughly in the shape of a cross-piece, the power tool 100 is set with an mounting seat, the mounting seat is set with an mounting groove 151, the linkage assembly 32 is held in the mounting groove 151, and can slide up and down along with the mounting groove 151 (observe from the direction shown in FIG. 14).

As shown in FIG. 15 to FIG. 18, the mounting groove 151 is set with two contact pieces on the opposite ends of the mounting groove, the two contact pieces 31 on one end are connected to the first positive electrode terminal 102 and the second negative electrode terminal 103 of the first male plug-in component 14 via wires, the two contact piece 31 on the other ends are connected to the first positive electrode terminal 106 and the second negative electrode terminal 107 of the second male plug-in component 24 via wires. A first contact point is set on the unconnected end of each of the contact pieces 31 (not marked). The linkage assembly 32 includes an insulating substrate 321 and two guide pieces 322 on the opposite end of the insulating substrate 321, the guide pieces 322 are set on the surface of the first side A facing the inching button 35, every guide piece 322 is set with two second contact point 323, used to respectively contact with the first contact point of the two contact pieces 31 on the same end.

Figure 22:
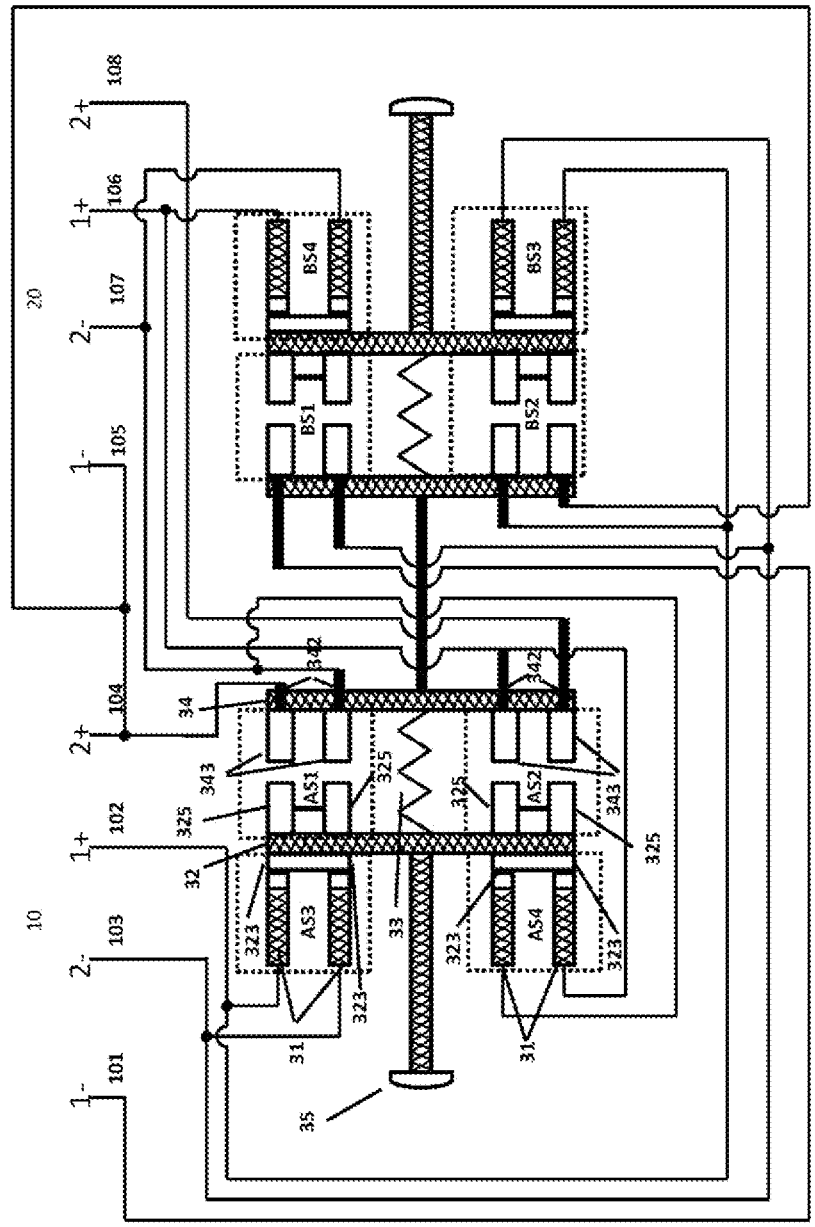
FIG. 22 is a wiring schematic diagram of the gang switch.

As shown in FIG. 22, the contact pieces 31 electrically connected with the first battery pack 10 are connected to the corresponding guide pieces 322, which forms the above-mentioned series switch AS3 connecting the first battery pack 10 in series, the contact pieces 31 electrically connected with the second battery pack 20 are connected to the corresponding guide pieces 322, which forms the above-mentioned series switch AS3 connecting the second battery pack 20 in series. At the initial status, due to the elastic part 33, the guide pieces 322 stay connected with the corresponding two contact pieces 31, so that the series switches AS3, AS4 form normally close switches.

Figure 19:
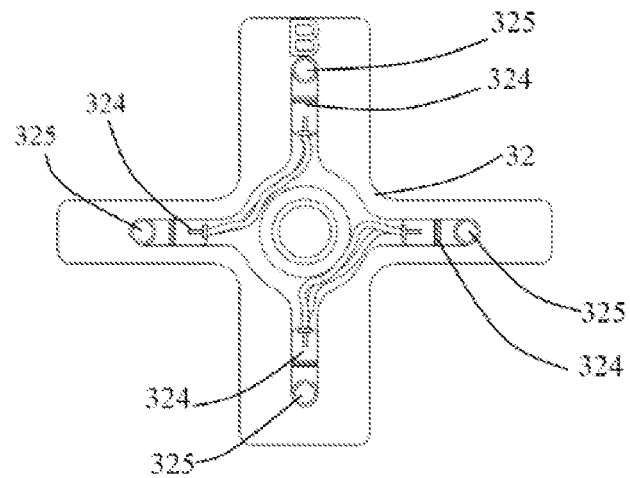
FIG. 19 is another plane view of the linkage assembly of the gang switch.
Figure 20:
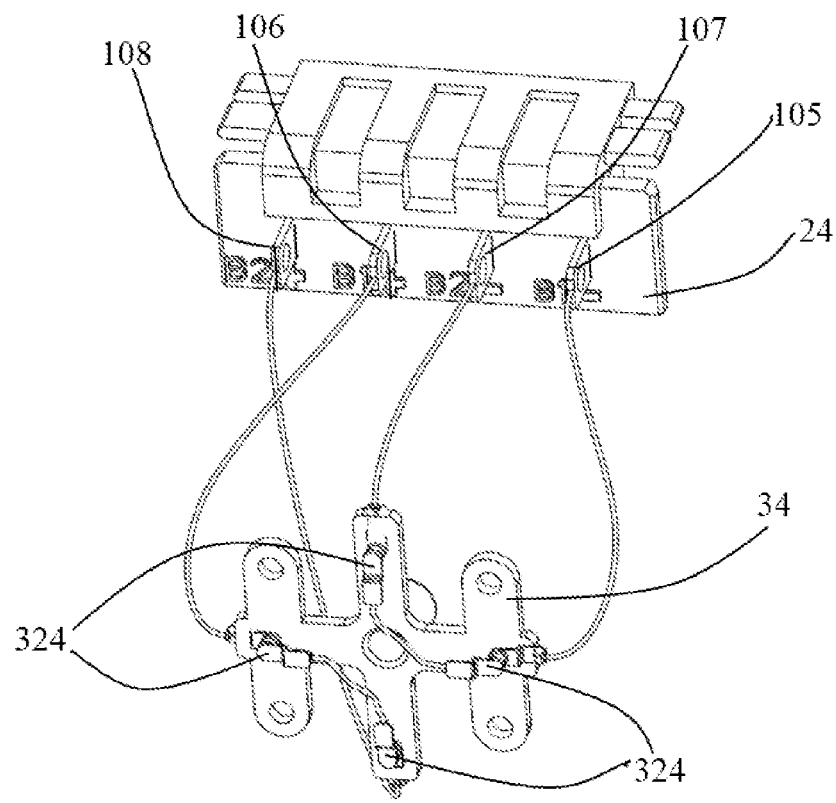
FIG. 20 is a wiring diagram of the linkage assembly of the gang switch.
Figure 21:
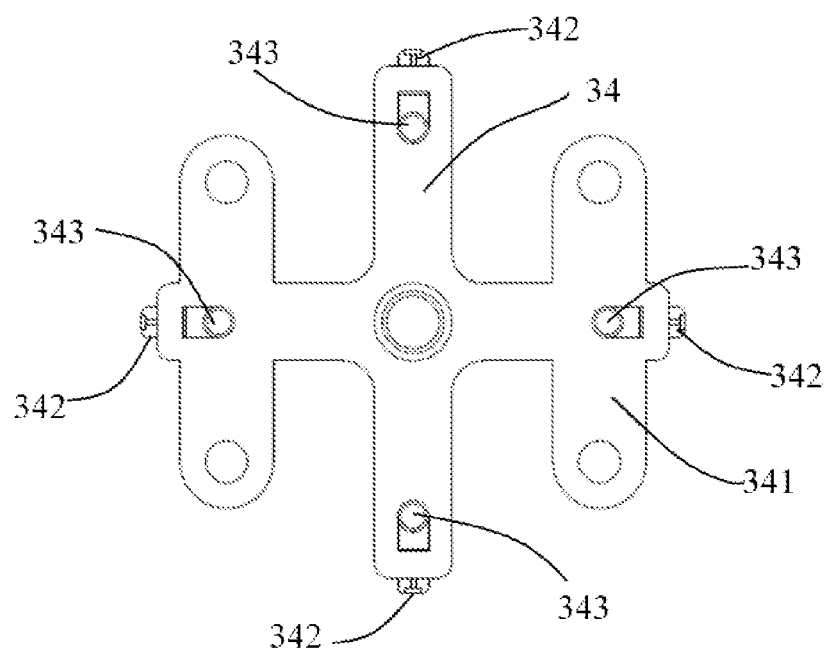
FIG. 21 is a plane view of the linkage assembly of the gang switch.
Figure 23:
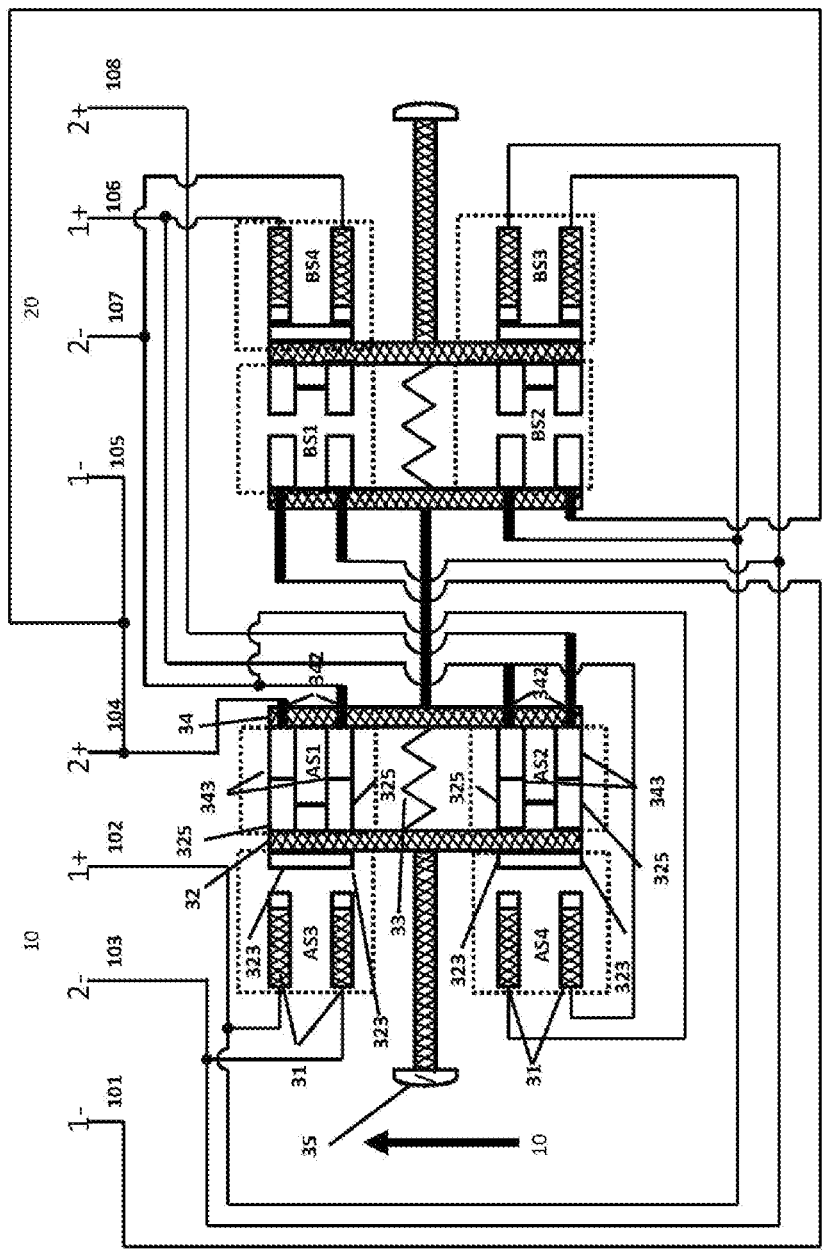
FIG. 23 is similar to FIG. 22, showing the position change of the gang switch when the first battery pack is installed.
Figure 24:
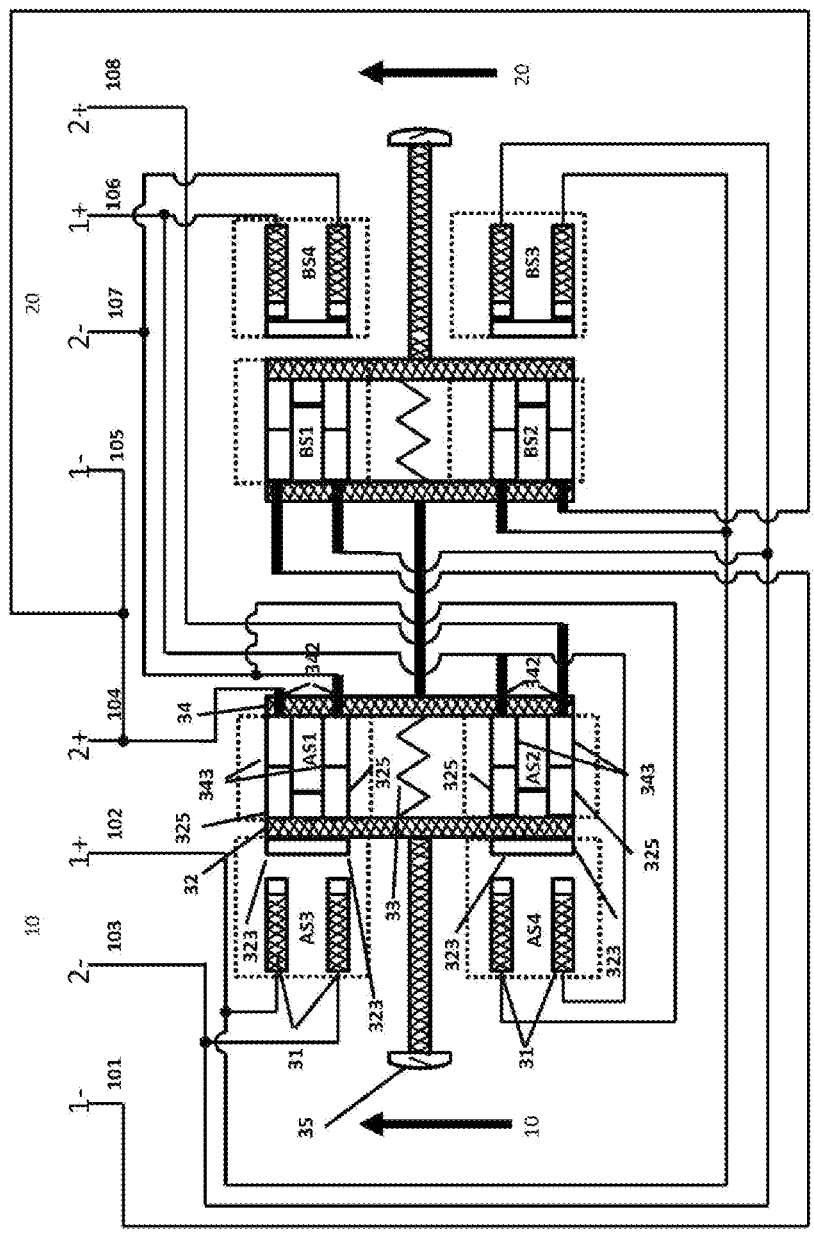
FIG. 24 is similar to FIG. 22, showing the position change of the gang switch when both the first and the second battery pack are installed.

As shown in FIG. 17 to FIG. 21, the platen assembly 34 is fixed by screw nails 36 on the screw posts 16 around the mounting groove 151, the platen assembly 34 includes an insulating substrate 341 and four conducting pieces 342 set on the insulating substrate 341, respectively connected with the four electrode terminals 105, 106,107, 108 of the second male plug-in component 24. The conducting pieces 342 are set with the third contact point 343 which protrude through the insulating substrate 341 and appear to face the linkage assembly 32. As shown in FIG. 19, four adapter pieces 324 are set on a second side B of the linkage assembly 32 facing the platen assembly 34 corresponding to the four conducting pieces 342 of the platen assembly 34, the two adapter pieces 324 corresponding to the first and second negative electrode terminal 105, 107 via the two conducting pieces 342 are connected by wires, the other two adapter pieces 324 corresponding to the first and second positive electrode terminal 106, 108 via the other two conducting pieces 342 are connected by wires. As shown in FIG. 19, each adapter piece 324 is set with a fourth contact points 325, fourth contact points 325 are correspond to the third contact points 343 on the conducting pieces 342. According to FIG. 22, the four conducting pieces 342, the four adapter pieces 324 and wires co-form the parallel switch AS1, AS2 to connect the above-mentioned two battery groups in the battery pack 20 in parallel. At the initial status, due to the elastic part 33, the guide pieces 322 stay unconnected with the corresponding two contact pieces 31, which leads the parallel switches AS1, AS2 as normally open switches. When the first battery pack is installed in the slot, the inching button 35 is pressed, the inching button pushes the linkage assembly 32 towards the platen assembly 34 via the driving shaft 352 which protrudes into the mounting groove 151. In this process, the contact pieces 31 and the platen assembly 34 stay unmoved, thus the contact pieces 31 and guide pieces 322 are disconnected, which switches the series switch AS3, AS4 from close to open; the adapter pieces 324 of the linkage assembly 32 are respectively connected to the corresponding conducting pieces 342 on the platen assembly 34, which switches the parallel switch AS1, AS2 from open to close. Thus, the installation of the first battery pack 10 controls the switching of the parallel switches AS1, AS2 and series switches AS3, AS4, the first battery pack 10 outputs a voltage of 48V, detail switching status can be referred from FIG. 5(*a*) and FIG. 23. In the same way, the other gang switch 3 forms the parallel switches BS1, BS2 and series switches BS3, BS4, the installation of the second battery pack 20 controls the switching of the parallel switches BS1, BS2 and series switches BS3, BS4, the second battery pack 20 outputs a voltage of 48V, detail switching status can be referred from FIG. 5(*b*). When the first battery pack 10 and the second battery pack 20 are installed simultaneously, all the switches are switched, the two battery packs 10, 20 output a total voltage of 48V, detail switching status can be referred from FIG. 5(*c*) and FIG. 24.

Embodiment 5

In the above embodiments 1 to 4, the output of the battery packs are controlled by switches, while a single battery pack 10 or 20 is installed, the battery pack 10 or 20 is switched to a high voltage output; while both battery packs 10 and 20 are installed, each battery pack of 10 and 20 is switched to a low voltage output, the two battery packs 10 and 20 output a total high voltage.

Figure 25:
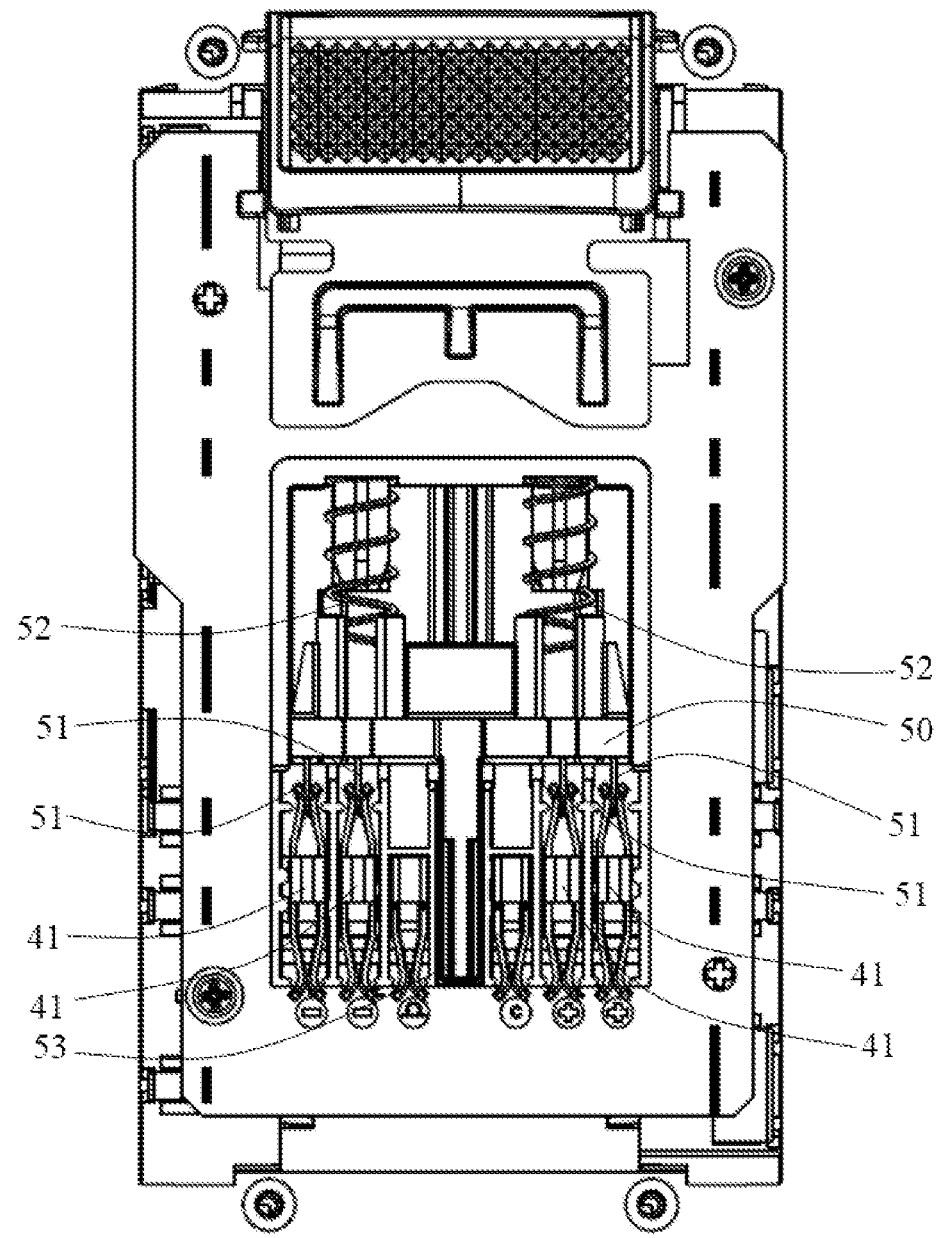
FIG. 25 is a partial plane view of the battery packs of a power tool according to the fifth embodiment disclosed.
Figure 26:
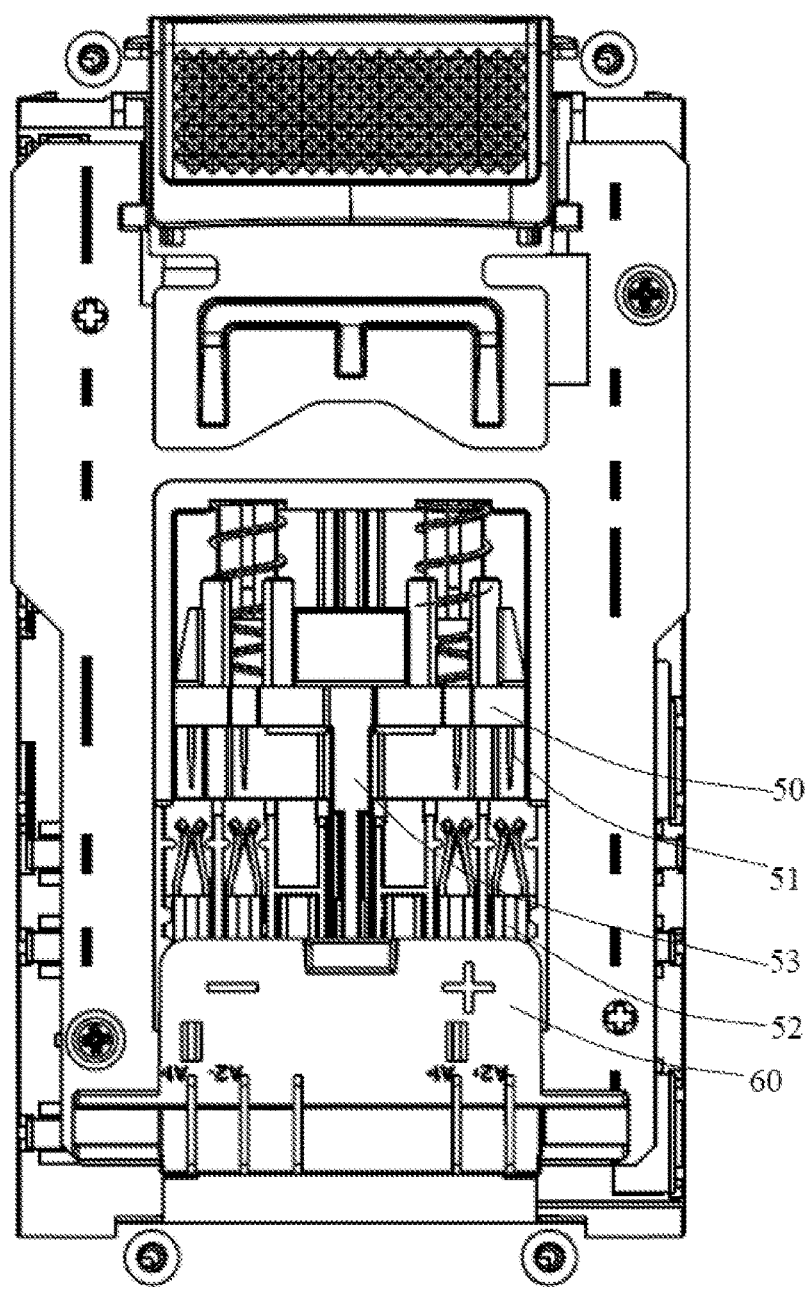
FIG. 26 is a partial plane view of the battery packs of FIG. 25 in another states.
Figure 27:
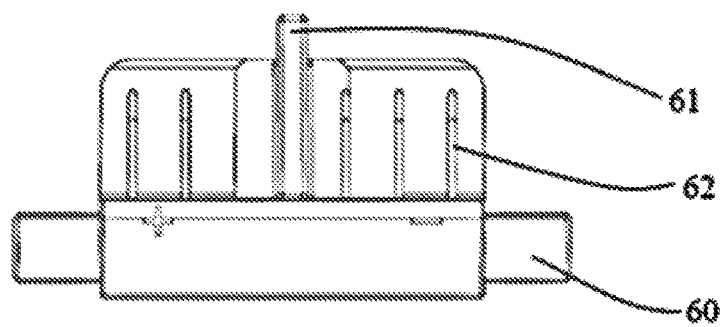
FIG. 27 is a plane view of the serial male socket shown in FIG. 25.

As shown in FIGS. 25 to 27, two third battery packs (not shown) can be provided, a parallel insert base 50 can be provided inside each third battery pack, the parallel insert base 50 is set with two U-shaped parallel terminals 51, under the action of springs 52, two U-shaped parallel terminals 51 are respectively connected with the two electrode inserts 41 with the same polarity in the corresponding two battery groups, so that the two battery groups in the third battery pack 40 are connected parallelly, output a default low voltage; and the two third battery pack are connect in series to output a high voltage. The power tool 100 is provided with a series male socket 60 which is provided with a protruding insulation column 61 and a series terminal 62.

When one of the third battery pack 40 is used to operate, the insulation column 61 of the series male socket 60 pushes the extended column 53 of the parallel insert base 50, which makes the parallel terminals 51 disconnected from electrode female terminals of the electrode inserts 41, and cancels the parallel connect states of the two battery groups, then the series terminals 62 of the series male socket 60 are connected with the corresponding two electrode female terminals 41 of the two battery groups with opposite polarities, which makes the two battery groups in the third battery pack 40 connected in series to form a high voltage output. Another positive electrode and another negative electrode that do not contact with the third battery pack 40 and the series terminal 62 are total positive and total negative electrode, each slot of the power tool 100 is provided with two electrode terminals connected with the total positive and total negative respectively. The other positive and negative of the third battery pack 40, which are not connected with the series terminals 62, are the total negative and the total positive, each slot of the power tool 100 is set with two electrode terminals respectively connected to the total negative and positive.

The above description are only preferable embodiments and explanation of the technical principles used, and the technical personnel in this domain should understand that the scope of disclosure covered in this application is not limited to any technical solution that is a particular combination of the technical features described above, and without disengaging from the disclosed idea, also includes other technical solutions formed by any combination of the above technical features or the equivalents, such as the technical solutions formed by the substitution of the technical features having similar functions with the above-mentioned technical features disclosed in this application (but not limited to).

Besides the technical features described in the description, the other technical features are already understood by one having ordinary skill in the art. In order to highlight the innovational features of this disclosure, the other technical features are not described herein.

What is claimed is:

1. A power tool comprising:
   a first slot; and
   a second slot; wherein,
   when the power tool is in a double-pack working state, battery packs are respectively arranged in the first slot and the second lot;
   when the power tool is in a single-pack working state, the battery pack is arranged in the first slot or the second slot, and
   both the double-pack working state and the single-pack working state provides a same rated voltage to the power tool;
   wherein, the battery pack in the first slot is defined as a first battery pack, the battery pack in the second slot is defined as a second battery pack, the first battery pack and the second battery pack have a same structure, and the first battery pack and the second battery pack respectively comprise two battery groups with a same output voltage value;
   wherein when the first battery pack and the second battery pack are simultaneously installed on the power tool, the two battery groups in the first battery pack and the second battery pack are connected in parallel, and the first battery pack and the second battery pack are connected in series; or when the first battery pack or the second battery pack is installed on the power tool, the two battery groups in the first battery pack or the second battery pack are connected in series;
   wherein, the power tool further comprises:
   a first control switch, used to control a connecting state of the two battery groups in the first battery pack; and
   a second control switch, used to control a connecting state of the two battery groups in the second battery pack.

2. The power tool according to claim 1, wherein the first control switch and the second control switch are mechanic control switch or electric control switch.

3. The power tool according to claim 2, wherein electrode terminals are provided in the first slot and the second slot directly or indirectly, electrode terminals connect with the electrode of the battery groups, the first control switch and the second control switch control connection states of electrode terminals so as to adjust the connection states of the battery packs inserted in the slot and adjust the connection states of two battery groups inside the battery pack.

4. The power tool according to claim 3, wherein the first slot and the second slot are respectively provided with a first positive terminal, a second positive terminal, a first negative terminal and a second negative terminal; the first positive terminal and the second positive terminal are connected with the positive poles of the two battery groups, and the first negative terminal and the second negative terminal are connected with the negative poles of the two battery groups; wherein
   the first negative terminal corresponding to the first battery pack is a total negative, the second positive terminal corresponding to the second battery pack is a total positive, the second positive terminal corresponding to the first battery pack and the first negative terminal corresponding to the second battery pack are connected at all times.

5. The power tool according to claim 4, wherein the first control switch and the second control switch respectively comprise two parallel switches and at least one series switch, wherein one parallel switch connects the first negative terminal with the second negative terminal, the other parallel switch connects the first positive terminal with the second positive terminal, the at least one series switch connects the second negative terminal and the first positive terminal; in an initial state, the two parallel switches are in an open state and the at least one series switch is in a closed state.

6. The power tool according to claim 5, wherein the first control switch and the second control switch includes two series switches, wherein
   the two parallel switches and one of the two series switches of the first control switch are controlled to switch by the first battery pack inserted into the first slot, the other series switch of the first control switch being controlled to switch by the second battery pack inserted into the second slot;
   the two parallel switches and one of the two series switches of the second control switch are controlled to switch by the second battery pack inserted into the second slot, the other series switch of the second control switch is controlled to switch by the first battery pack inserted into the first slot.

7. The power tool according to claim 6, wherein
   the parallel switches and series switches are single-pole single-throw switches, the electric tool is provided with four electrode terminals in the first slot and four electrode terminals in the second slot, the four electrode terminals in the first slot respectively control the two parallel switches and the two series switches triggered by the first battery pack, and the four electrode terminals in the second slot respectively control the two parallel switches and the two series switches triggered by the second battery pack; or the two parallel switches and the two series switches controlled by the same battery pack are double-pole double-throw switches, the electric tool is provided with two electrode terminals in the first slot and two electrode terminals in the second slot, the two electrode terminals in the first slot respectively control the two double-pole double-throw switches triggered by the first battery pack, and the two electrode terminals in the second slot respectively control the two double-pole double-throw switches triggered by the second battery pack.

8. The power tool according to claim 6, further comprising a gang switch having:
a plurality of contact pieces;
a linkage assembly, including a plurality of guide pieces and a plurality of adapter pieces; and
a platen assembly, including a plurality of conducting pieces; and
an inching button; wherein
the contact pieces and the conducting pieces are respectively connected with corresponding electrode terminals, so that the contact pieces, guide pieces and corresponding electrode terminals form the two series switches controlled by the first battery pack or the second battery pack, and adapter pieces, conducting pieces and corresponding electrode terminals form the two parallel switches controlled by the first battery pack or the second battery pack.

9. The power tool according to claim 8, the guide pieces are arranged on one side, facing the contact piece, of the linkage assembly, the adapter pieces are arranged on one side, facing the platen assembly, of the linkage assembly, and the inching button protrudes into the first slot and/or the second slot; initially, the guide piece is communicated with the contact piece, the adapter piece is separated from the conducting piece, the inching button is pressed when the first battery pack and/or the second battery pack is inserted into the corresponding first slot and/or second slot, the inching button drives the linkage assembly to move towards the platen assembly, then the guide connecting piece is separated from the contact piece, and the adapter piece is communicated with the conducting strip in a contact state.

10. The power tool according to claim 9, wherein the gang switch further includes an elastic part between the linkage assembly and the platen assembly, the elastic part is used to drive the linkage assembly to reset.

11. The power tool according to claim 10, further comprising a mounting seat, wherein the gang switch is mounted on the mounting seat, the mounting seat is provided with a mounting groove, the contact piece is fixed on the side wall of the mounting seat, the platen assembly is fixed at the top of the mounting groove, and the linkage assembly is movably arranged in the mounting groove and located between the contact piece and the platen assembly.

12. The power tool according to claim 8, wherein a male plug-in component is arranged in the slot, and the electrode terminals are arranged on the male plug-in component.

13. The power tool according to claim 5, further comprising
a micro control unit, connected to the two parallel switches and the at least one series switch, wherein
when detecting the first slot being installed with the first battery pack, the micro control unit closes the parallel switches of the first control switch;
when detecting the second slot being installed with the second battery pack, the micro control unit closes the parallel switches of the second control switch;
when detecting the first slot and the second slot being respectively installed with the first battery pack and the second battery pack, the series switches of the first control switch and the second control switch are simultaneously turned off, and the parallel switches of the first control switch and the second control switch are simultaneously turned on.

14. The power tool according to claim 3, wherein a male plug-in component is arranged in the slot, and the electrode terminals are arranged on the male plug-in component.

15. The power tool according to claim 1, wherein the battery pack in the first slot is defined as a first battery pack, the battery pack in the second slot is defined as a second battery pack, the first battery pack and the second battery pack have the same structure, the first battery pack and the second battery pack respectively include a single battery group with a same output voltage value; wherein
the first battery pack or the second battery pack is used alone to output a rated voltage; or
the first battery pack and the second battery pack are connected in parallel to output a rated voltage.

16. A power tool system, comprising:
a first battery pack;
a second battery pack;
a power tool having:
a first slot configured to couple with the first battery pack, and
a second slot configured to couple with the second battery pack;
wherein when the power tool is in a double-pack working state, the first battery pack is arranged in the first slot and the second battery pack is arranged in the second slot;
wherein when the power tool is in a single-pack working state, the first battery pack is arranged in the first slot or the second battery pack is arranged in the second slot, and
wherein both the double-pack working state and the single-pack working state provides a same rated voltage to the power tool;
wherein, the battery pack in the first slot is defined as a first battery pack, the battery pack in the second slot is defined as a second battery pack, the first battery pack and the second battery pack have a same structure, and the first battery pack and the second battery pack respectively comprise two battery groups with a same output voltage value;
wherein when the first battery pack and the second battery pack are simultaneously installed on the power tool, the two battery groups in the first battery pack and the second battery pack are connected in parallel, and the first battery pack and the second battery pack are connected in series; or when the first battery pack or the second battery pack is installed on the power tool, the two battery groups in the first battery pack or the second battery pack are connected in series;
wherein, the power tool further comprises:
a first control switch, used to control a connecting state of the two battery groups in the first battery pack; and
a second control switch, used to control a connecting state of the two battery groups in the second battery pack.

* * * * *